US012065596B2

(12) United States Patent
Hatakeyama et al.

(10) Patent No.: US 12,065,596 B2
(45) Date of Patent: Aug. 20, 2024

(54) ADHESIVE TAPE

(71) Applicant: Mitsubishi Chemical Corporation, Tokyo (JP)

(72) Inventors: Takuya Hatakeyama, Tokyo (JP); Kento Sakamoto, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 17/182,649

(22) Filed: Feb. 23, 2021

(65) Prior Publication Data
US 2021/0171803 A1 Jun. 10, 2021

Related U.S. Application Data

(63) Continuation of application No. PCT/JP2019/032549, filed on Aug. 21, 2019.

(30) Foreign Application Priority Data

Sep. 5, 2018 (JP) .................. 2018-166163
Sep. 5, 2018 (JP) .................. 2018-166164

(51) Int. Cl.
| | |
|---|---|
| *C09J 7/26* | (2018.01) |
| *C08G 63/181* | (2006.01) |
| *C08G 63/52* | (2006.01) |
| *C09J 7/24* | (2018.01) |
| *C09J 7/25* | (2018.01) |
| *C09J 7/30* | (2018.01) |

(52) U.S. Cl.
CPC ............ *C09J 7/243* (2018.01); *C08G 63/181* (2013.01); *C08G 63/52* (2013.01); *C09J 7/245* (2018.01); *C09J 7/25* (2018.01); *C09J 7/26* (2018.01); *C09J 7/30* (2018.01); *C08G 2170/00* (2013.01); *C09J 2301/12* (2020.08); *C09J 2301/30* (2020.08); *C09J 2400/24* (2013.01); *C09J 2423/041* (2013.01); *C09J 2423/101* (2013.01); *C09J 2433/001* (2013.01); *C09J 2467/00* (2013.01); *C09J 2475/001* (2013.01)

(58) Field of Classification Search
None
See application file for complete search history.

(56) References Cited

U.S. PATENT DOCUMENTS

| | | | | |
|---|---|---|---|---|
| 4,276,107 A | * | 6/1981 | Pufahl ..................... | C09J 7/26 156/247 |
| 2005/0031858 A1 | | 2/2005 | Tachibana et al. | |
| 2012/0208016 A1 | * | 8/2012 | Takahira ............. | C08G 18/428 428/355 R |
| 2013/0004769 A1 | | 1/2013 | Okamoto et al. | |
| 2015/0315424 A1 | | 11/2015 | Lee et al. | |
| 2017/0029675 A1 | | 2/2017 | Yoshie et al. | |
| 2017/0037283 A1 | | 2/2017 | Yamamoto et al. | |
| 2018/0215970 A1 | | 8/2018 | Liu et al. | |
| 2020/0216720 A1 | | 7/2020 | Sakamoto | |

FOREIGN PATENT DOCUMENTS

| | | | | |
|---|---|---|---|---|
| CN | 102822302 A | | 12/2012 | |
| CN | 207632740 A | | 7/2018 | |
| EP | 2 799 472 | | 11/2014 | |
| JP | 10-095908 | | 4/1998 | |
| JP | 2002-309198 A | | 10/2002 | |
| JP | 2004137295 | * | 5/2004 | ........... C08G 63/692 |
| JP | 2009-007419 A | | 1/2009 | |
| JP | 2009-013201 A | | 1/2009 | |
| JP | 2014-218077 | | 11/2014 | |
| JP | 2015-044888 | | 3/2015 | |
| JP | 2015-196822 | | 11/2015 | |
| JP | 2016-104847 A | | 6/2016 | |
| JP | 2017-014333 | | 1/2017 | |
| JP | 2018-109150 | | 7/2018 | |
| JP | 2019-073685 | | 5/2019 | |
| WO | 2017/030881 A1 | | 2/2017 | |
| WO | 2018/124200 A1 | | 7/2018 | |

OTHER PUBLICATIONS

Machine translation of Toomi et al. (JP H10-095908 A). (Year: 1998).*
Machine translation of JP2004137295A (Year: 2004).*
ISR issued in WIPO Patent Application No. PCT/JP2019/032549, Oct. 8, 2019, English translation.
Written Opinion issued in WIPO Patent Application No. PCT/JP2019/032549, Oct. 8, 2019, English translation.
IPRP issued in WIPO Patent Application No. PCT/JP2019/032549, Mar. 9, 2021, English translation.
Search Report issued in EPO Patent Application No. 19858246.2, Sep. 20, 2021.
Office Action issued in CN Patent Application No. 201980055162.6, Jan. 11, 2022, translation.
Office Action issued in CN Patent Application No. 201980055162.6, Jul. 6, 2022, with English translation.

(Continued)

*Primary Examiner* — Scott R. Walshon
*Assistant Examiner* — Thomas A Mangohig
(74) *Attorney, Agent, or Firm* — GREENBLUM & BERNSTEIN, P.L.C.

(57) ABSTRACT

An adhesive tape includes a substrate [I] and an adhesive agent layer of a polyester adhesive agent provided on at least one of opposite surfaces of the substrate [I]. The substrate [I] is one selected from a polyolefin resin foam substrate, a urethane resin foam substrate, and an acrylic resin foam substrate. The polyester adhesive agent is made from a polyester adhesive agent composition [II] which contains a polyester resin (A) having a weight average molecular weight of 5,000 to 300,000, and having a structural unit derived from a polyol and a structural unit derived from a polyvalent carboxylic acid compound containing an aromatic structure-containing compound in a proportion of not greater than 80 mol %. The adhesive tape is excellent in adherence between a polyester adhesive agent layer and a polyolefin resin foam substrate, a urethane resin foam substrate, or an acrylic resin foam substrate.

5 Claims, No Drawings

(56) References Cited

OTHER PUBLICATIONS

Office Action issued in CN Patent Application No. 201980055162.6, Sep. 28, 2022, translation.
Rejection Decision issued in CN Patent Application No. 201980055162.6, Feb. 18, 2023, translation.
Dahua Liu et al., "A Comprehensive Handbook of Synthetic Rubber Technology", Compiled by Lanzhou Chemical Industry Corporation, Beijing: Chemical Industry Press, pp. 888-889, 1991-12.
Office Action issued in Japanese Patent Application No. 2019-150942, Apr. 25, 2023, translation.
Office Action issued in JP Patent Application No. 2019-150942, Dec. 13, 2022, translation.
Office Action issued in JP Patent Application No. 2019-150943, Dec. 13, 2022, translation.
Official Communication issued in EP Patent Application No. 19858246.2, Oct. 23, 2023.

* cited by examiner

ADHESIVE TAPE

RELATED APPLICATION

This application is a continuation of International Application No. PCT/JP2019/032549, filed on Aug. 21, 2019, which claims priority to Japanese Patent Application No. 2018-166163 and 2018-166164, filed on Sep. 5, 2018, the entire contents of each of which being hereby incorporated by reference.

TECHNICAL FIELD

The present disclosure relates to an adhesive tape and, more specifically, to an adhesive tape including a substrate and an adhesive agent layer of a polyester adhesive agent having excellent adherence to the substrate.

BACKGROUND ART

Conventionally, polyester resins are used in a wide variety of applications such as for films, plastic bottles, fibers, toners, electrical components, bonding agents, and adhesive agents because of their excellent heat resistance, chemical resistance, durability, and mechanical strength. Particularly, the polyester resins are noticeably used for the adhesive agents.

From the viewpoint of processability, flexibility, higher strength, heat insulation properties, durability, and the like, it is effective to use a polyolefin resin foam substrate as a substrate for an adhesive tape (see, for example, PTL 1). From the viewpoint of impact resistance and sealability, it is effective to use a foam substrate such as urethane resin foam substrate or acrylic resin foam substrate as a substrate for an adhesive tape (see, for example, PTL 2).

RELATED ART DOCUMENTS

Patent Documents

PTL 1: JP-A-2015-044888
PTL 2: JP-A-2017-014333

SUMMARY

However, the adhesive tape described in PTL 1 is insufficient in adherence between the polyolefin resin foam substrate and the adhesive agent layer of the polyester adhesive agent, requiring further improvement.

The adhesive tape described in PTL 2 is insufficient in adherence between the polyester adhesive agent and the urethane resin foam substrate or the acrylic resin foam substrate, and insufficient in adhesiveness to a polyolefin adherend. Therefore, further improvement is required with the need for adding a tackifier to the polyester adhesive agent.

In view of the foregoing, it is an object of the present disclosure to provide an adhesive tape which is excellent in adherence between a polyester adhesive agent layer and a polyolefin resin foam substrate, a urethane resin foam substrate or an acrylic resin foam substrate, and is excellent in adhesiveness to a polyolefin adherend.

The inventors conducted intensive studies in view of the forgoing and, as a result, found that, where a polyester adhesive agent which contains a polyester resin having a weight average molecular weight of 5,000 to 300,000, and having a structural unit derived from a polyol and a structural unit derived from a polyvalent carboxylic acid compound containing an aromatic structure-containing compound in a proportion of not greater than 80 mol % is used for an adhesive tape, the adhesive tape is excellent in adherence between the polyester adhesive agent and a polyolefin resin foam substrate, a urethane resin foam substrate or an acrylic resin foam substrate and in adhesiveness to a polyolefin adherend, and achieved the present disclosure.

In general, an acrylic adhesive agent is often used as the adhesive agent, and employed for an adhesive tape including a foam substrate. However, the acrylic adhesive agent has insufficient adherence to the foam substrate and, therefore, the adhesive tape is unsatisfactory in adhesiveness to an adherend, particularly to a polyolefin adherend. In contrast, it was found that an adhesive tape produced by using the polyester adhesive agent is excellent in adherence between the polyester adhesive agent and the foam substrate and in adhesiveness to the adherend.

According to the present disclosure, an adhesive tape is provided, which includes a substrate [I] and an adhesive agent layer of a polyester adhesive agent provided on at least one of opposite surfaces of the substrate [I], wherein the substrate [I] is one selected from the group consisting of a polyolefin resin foam substrate, a urethane resin foam substrate, and an acrylic resin foam substrate, wherein the polyester adhesive agent is an adhesive agent made from a polyester adhesive agent composition [II] which contains a polyester resin (A) having a weight average molecular weight of 5,000 to 300,000, and having a structural unit derived from a polyol and a structural unit derived from a polyvalent carboxylic acid compound containing an aromatic structure-containing compound in a proportion of not greater than 80 mol %.

The adhesive tape according to the present disclosure includes the substrate [I] and the adhesive agent layer of the polyester adhesive agent provided on at least one of the opposite surfaces of the substrate [I]. The substrate [I] is selected from the group consisting of the polyolefin resin foam substrate, the urethane resin foam substrate, and the acrylic resin foam substrate. The polyester adhesive agent is made from the polyester adhesive agent composition [II] which contains the polyester resin (A) having a weight average molecular weight of 5,000 to 300,000 and having the structural unit derived from the polyol and the structural unit derived from the polyvalent carboxylic acid compound containing the aromatic structure-containing compound in a proportion of not greater than 80 mol %. Therefore, the adhesive tape according to the present disclosure is excellent in adherence between the polyester adhesive agent layer and the polyolefin resin foam substrate, the urethane resin foam substrate or the acrylic resin foam substrate, and is excellent in adhesiveness to the polyolefin adherend.

DESCRIPTION OF EMBODIMENT

A preferred embodiment of the present disclosure will hereinafter be described in detail by way of example.

In the present disclosure, the term "tape" is intended to include a film and a sheet.

In the present disclosure, the term "(meth)acrylic" means acrylic or methacrylic, and the term "(meth)acryloyl" means acryloyl or methacryloyl. Further, the term "(meth)acrylate" means acrylate or methacrylate.

<Substrate [I]>
A feature of the present disclosure is that a polyolefin resin foam substrate, a urethane resin foam substrate or an acrylic resin foam substrate is used as a substrate [I] for an adhesive sheet.

The polyolefin resin foam substrate, the urethane resin foam substrate, and the acrylic resin foam substrate are produced in the form of foams by foaming a polyolefin resin composition, a urethane resin composition, and an acrylic resin composition, respectively.

The foam substrates described above (substrate [I]) each typically have an apparent density of 10 to 1,000 $kg/m^3$, preferably 50 to 900 $kg/m^3$, particularly preferably 70 to 700 $kg/m^3$, from the viewpoint of excellent adherence between the substrate [I] and an adhesive agent layer.

The apparent density may be measured in conformity with JIS K7222.

The apparent density of the polyolefin resin foam substrate is preferably 10 to 300 $kg/m^3$, particularly preferably 50 to 250 $kg/m^3$, more preferably 70 to 200 $kg/m^3$, from the viewpoint of excellent adherence between the polyolefin resin foam substrate and the adhesive agent layer. If the apparent density of the polyolefin resin foam substrate is excessively small or great, the adherence between the polyolefin resin foam substrate and the adhesive agent layer tends to be reduced.

The apparent density of the urethane resin foam substrate or the acrylic resin foam substrate is preferably 100 to 1,000 $kg/m^3$, particularly preferably 200 to 900 $kg/m^3$, more preferably 250 to 800 $kg/m^3$, especially preferably 300 to 700 $kg/m^3$, from the viewpoint of excellent adherence between the foam substrate and the adhesive agent layer. If the apparent density of the urethane resin foam substrate or the acrylic resin foam substrate is excessively small or great, the adherence between the foam substrate and the adhesive agent layer tends to be reduced.

The cells of the polyolefin resin foam substrate, the urethane resin foam substrate, and the acrylic resin foam substrate may be closed cells or open cells. The closed cells and the open cells may coexist in the foam substrates.

The cells typically each have a spherical shape, not by way of limitation.

The foam substrates described above typically each have an average cell diameter of 1 to 1,500 μm, preferably 5 to 700 μm.

The polyolefin resin foam substrate preferably has an average cell diameter of 1 to 1,000 μm, particularly preferably 10 to 500 μm.

The urethane resin foam substrate and the acrylic resin foam substrate preferably each have an average cell diameter of 5 to 500 μm, particularly preferably 50 to 400 μm.

Where the average cell diameter of the polyolefin resin foam substrate falls within the aforementioned range, the polyolefin resin foam substrate tends to be excellent in tensile strength, flexibility, processability, surface smoothness, and followability.

The foam substrates described above preferably each have a thickness of 0.1 to 2 mm, particularly preferably 0.2 to 1.5 mm, more preferably 0.3 to 1 mm, from the viewpoint of excellent adherence between the foam substrate and the adhesive agent layer. If the thickness of the foam substrate is excessively small, the flexibility and the impact resistance tend to be reduced. If the thickness of the foam substrate is excessively great, the processability and the surface smoothness tend to be reduced.

The foam substrates described above typically each have a tensile strength of 0.1 to 3 MPa, preferably 0.2 to 2 MPa.

The polyolefin resin foam substrate typically has a tensile strength of 0.1 to 2 MPa, preferably 0.2 to 1 MPa.

The urethane resin foam substrate and the acrylic resin foam substrate typically each have a tensile strength of 0.1 to 2.5 MPa, preferably 0.3 to 1.5 MPa.

If the tensile strength of the foam substrate is excessively small, the foam substrate tends to suffer from cracking due to insufficient strength. If the tensile strength of the foam substrate is excessively great, the impact resistance tends to be reduced.

The foam substrates described above typically each have an elongation percentage of 50 to 600%, preferably 70 to 400%.

The polyolefin resin foam substrate preferably has an elongation percentage of 50 to 500%, particularly preferably 70 to 300%.

The urethane resin foam substrate and the acrylic resin foam substrate preferably each have an elongation percentage of 50 to 300%, particularly preferably 70 to 200%.

If the elongation percentage of the foam substrate is excessively small, the impact resistance tends to be reduced. If the elongation percentage is excessively great, the adhesive strength tends to be reduced due to insufficient strength.

The tensile strength and the elongation percentage of each of the foam substrates are determined by cutting the substrate to a size of 10 mm×50 mm in an environment at 23° C. at 50% RH, setting the resulting sample to an autograph (AUTOGRAPH AG-X PLUS 500N available from Shimadzu Corporation) with a chuck distance adjusted to 25 mm, and stretching the sample at a stretching speed of 50 mm/minute.

As described above, the substrate [I] to be used in the present disclosure is selected from the group consisting of the polyolefin resin foam substrate, the urethane resin foam substrate, and the acrylic resin foam substrate. Of these, the polyolefin resin foam substrate and the urethane resin foam substrate are preferred.

The foam substrates will hereinafter be described.

[Polyolefin Resin Foam Substrate]

The polyolefin resin composition for the polyolefin resin foam substrate contains a polyolefin resin. The polyolefin resin is typically a resin containing C2 to C20 α-olefin as a monomer unit, and preferred examples of the polyolefin resin include polyethylene resin and polypropylene resin from the viewpoint of adherence between the polyolefin resin foam substrate and the polyester adhesive agent.

[Polyethylene Resin]

The polyethylene resin may be a homopolymer of ethylene or a copolymer of ethylene and α-olefin, or may be a copolymer of ethylene and vinyl acetate. However, the polyethylene resin excludes an olefin elastomer and an olefin plastomer to be described later. These polyolefin resins may be used alone or in combination.

The α-olefin to be copolymerized with ethylene is typically a C2 to C10 α-olefin, preferably a C4 to C10 α-olefin. Specific examples of the α-olefin include propylene, 1-butene, 1-pentene, 4-methyl-1-pentene, 1-hexene, 1-heptene, 1-octene, and 1-decene.

Of the polyethylene resins described above, the ethylene homopolymer is preferred from the viewpoint of excellent adherence between the foam substrate and the adhesive agent layer.

[Polypropylene Resin]

The polypropylene resin may be a homopolymer of propylene or a copolymer of propylene and an α-olefin.

The α-olefin to be copolymerized with propylene is typically a C2 to C12 α-olefin, preferably a C4 to C12

α-olefin. Specific examples of the α-olefin include propylene, 1-butene, 1-pentene, 4-methyl-1-pentene, 1-hexene, 1-heptene, 1-octene, 1-decene, and 1-dodecene.

Of the polypropylene resins described above, the propylene homopolymer is preferred from the viewpoint of excellent adherence between the foam substrate and the adhesive agent layer.

The polyolefin resin composition may contain an additional resin other than the polyolefin resin, for example, elastomer, olefin plastomer or rubber, as long as the effects of the present disclosure are not impaired.

The elastomer has a structure including a combination of a hard segment and a soft segment. The elastomer has rubber elasticity at an ordinary temperature (23° C.), and is plasticized like thermoplastic resins at a higher temperature.

Examples of the elastomer include olefin elastomers such as ethylene-propylene-diene copolymers, ethylene-vinyl acetate copolymers, polybutenes, and chlorinated polyethylenes, styrene elastomers, polyester elastomers, polyamide elastomers, and polyurethane elastomers.

The olefin plastomer is an ultra-low density polyethylene resin prepared by copolymerizing ethylene and a C4 to C8 α-olefin with the use of a single site catalyst such as a metallocene catalyst, and has intermediate properties between plastics and elastomers.

The polyolefin resin composition may contain known additives, as long as the effects of the present disclosure are not impaired. Examples of the known additives include surfactant, dispersant, weather resistance stabilizer, light stabilizer, pigment, dye, flame retardant, plasticizer, lubricant, UV absorber, antioxidant, filler, reinforcing agent, and antistatic agent.

A method for producing the polyolefin resin foam substrate is not particularly limited, but may be produced by a common production method. The polyolefin resin foam substrate may be a crosslinked polyolefin resin foam substrate, or may be an uncrosslinked polyolefin resin foam substrate.

A production method for the crosslinked polyolefin resin foam substrate will first be described, and then a production method for the uncrosslinked polyolefin resin foam substrate will be described.

[Production Method for Crosslinked Polyolefin Resin Foam Substrate]

The crosslinked polyolefin resin foam substrate is typically produced by crosslinking the polyolefin resin composition and foaming the crosslinked polyolefin resin composition.

Specifically, an exemplary method for producing the polyolefin resin foam substrate includes the steps of: melt-kneading the polyolefin resin and a foaming agent of thermal decomposition type and, as required, the additional resin other than the polyolefin resin, and additives and other ingredients to be described later, and extruding the resulting melt into a sheet from an extruder to prepare a sheet-shaped polyolefin resin composition; crosslinking the sheet-shaped polyolefin resin composition; and heating the crosslinked sheet-shaped polyolefin resin composition to foam the thermal decomposition type foaming agent.

The thermal decomposition type foaming agent may be an organic foaming agent or an inorganic foaming agent.

Examples of the organic foaming agent include: azo compounds such as azodicarbonamide, metal azodicarboxylates (e.g., barium azodicarboxylate), and azobisisobutyronitrile; nitroso compounds such as N,N'-dinitrosopentamethylenetetramine; hydrazine derivatives such as hydrazodicarbonamide, 4,4'-oxybis(benzenesulfonylhydrazide), and toluenesulfonylhydrazide; and semicarbazide compounds such as toluenesulfonylsemicarbazide.

Examples of the inorganic foaming agent include ammonium carbonate, sodium carbonate, ammonium hydrogen carbonate, sodium hydrogen carbonate, ammonium nitrite, sodium borohydride, and anhydrous monosodium citrate.

Of these thermal decomposition type foaming agents, the azo compounds are preferred, and azodicarbonamide is particularly preferred from the viewpoint of fine cells, economy, and safety. These thermal decomposition type foaming agents may be used alone or in combination.

The proportion of the thermal decomposition type foaming agent is typically 1 to 10 parts by weight, preferably 1 to 5 parts by weight, more preferably 1.5 to 3.5 parts by weight, based on 100 parts by weight of the polyolefin resin.

The crosslinking degree (gel fraction) of the polyolefin resin composition crosslinked in the sheet-shaped polyolefin resin composition crosslinking step is preferably 20 to 70 wt. %.

Exemplary methods for crosslinking the sheet-shaped polyolefin resin foam composition include: a method in which an organic peroxide is blended in the polyolefin resin composition, and thermally decomposed to crosslink the polyolefin resin composition; and a method in which the polyolefin resin composition is irradiated with ionizing radiation such as electron beam, α-ray, β-ray or γ-ray for the crosslinking.

Examples of the organic peroxide include 1,1-bis(t-butylperoxy)-3,3,5-trimethylcyclohexane and 1,1-bis(t-butylperoxy)cyclohexane, which may be used alone or in combination.

The proportion of the organic peroxide is typically 0.01 to 5 parts by weight, preferably 0.1 to 3 parts by weight, based on 100 parts by weight of the polyolefin resin.

Where the ionizing radiation is used, the dose of the irradiation is typically 0.5 to 20 Mrad, preferably 3 to 15 Mrad so as to adjust the crosslinking degree within the aforementioned range.

The crosslinking methods described above may be used alone or in combination. From the viewpoint of uniform crosslinking, however, the method in which the polyolefin resin composition is irradiated with the ionizing radiation is preferred.

Exemplary heating methods to be employed in the step of heating the crosslinked sheet-shaped polyolefin resin composition to foam the thermal decomposition type foaming agent include: a method employing hot air for the heating; a method employing infrared radiation for the heating; a method employing salt bath for the heating; and a method employing an oil bath for the heating. These methods may be used alone or in combination.

In the production method for the crosslinked polyolefin resin foam substrate, a foam cell nucleation adjusting agent, a decomposition temperature adjusting agent, a crosslinking assistant, an antioxidant, and/or the like may be contained in the polyolefin resin composition. Thus, the crosslinked polyolefin resin foam substrate is produced.

[Production Method for Uncrosslinked Polyolefin Resin Foam Substrate]

The uncrosslinked polyolefin resin foam substrate can be produced, for example, by extrusion-foaming the polyolefin resin composition. The polyolefin resin composition is kneaded in an extruder, and extruded from a die provided at a distal end of the extruder to be thereby foamed. Thus, the uncrosslinked polyolefin resin foam substrate is produced.

The polyolefin resin composition to be used for the uncrosslinked polyolefin resin foam substrate contains a foaming agent.

A generally known foaming agent may be used as the foaming agent, and examples of the foaming agent include: hydrocarbons such as propane, n-butane, isobutane, n-pentane, isopentane, neopentane, cyclopentane, cyclopentadiene, n-hexane, and petroleum ether; ketones such as acetone and methyl ethyl ketone; alcohols such as methanol, ethanol, and isopropyl alcohol; ether compounds each having a lower boiling point such as dimethyl ether, diethyl ether, dipropyl ether, and methyl ethyl ether; halogen-containing hydrocarbons such as trichloromonofluoromethane and dichlorodifluoromethane; and inorganic gases such as carbon dioxide, nitrogen, and ammonia. These foaming agents may be used alone or in combination. Of these, inorganic gases are preferred, and carbon dioxide is more preferred. Carbon dioxide is preferably in a supercritical state, in a subcritical state, or in a liquefied state.

In the production method for the uncrosslinked polyolefin resin foam substrate, a foam cell nucleating agent or the like may be added to the polyolefin resin composition.

In the extrusion foaming, production conditions such as process temperature, process pressure, and process time are properly set so that the resulting polyolefin resin foam substrate has the physical properties described above.

Thus, the uncrosslinked polyolefin resin foam substrate is produced.

In this way, the crosslinked polyolefin resin foam substrate and the uncrosslinked polyolefin resin foam substrate are produced. These polyolefin resin foam substrates may be stretched. The stretching may be carried out after foaming the polyolefin resin composition, or while foaming the polyolefin resin composition.

[Urethane Resin Foam Substrate]

The urethane resin foam substrate is produced by preparing a urethane resin composition containing a urethane resin prepared by a reaction between a polyol and a polyisocyanate, and foaming the urethane resin composition.

Examples of the polyol include polyester polyol, polyether polyol, and polymer polyol, which may be used alone or in combination.

The polyester polyol may be, for example, a polycondensation product prepared by a polycondensation reaction between one selected from the group consisting of dicarboxylic acids such as phthalic acid, isophthalic acid, terephthalic acid, naphthalenedicarboxylic acid, succinic acid, tartaric acid, oxalic acid, malonic acid, glutaric acid, adipic acid, pimelic acid, suberic acid, glutaconic acid, azelaic acid, sebacic acid, 1,4-cyclohexyldicarboxylic acid, α-hydromuconic acid, β-hydromuconic acid, α-butyl-α-ethylglutaric acid, α,β-diethylsuccinic acid, maleic acid, and fumaric acid, and anhydrides of these dicarboxylic acids, and at least one selected from the group consisting of low-molecular weight polyols having a molecular weight of not greater than 500 such as ethylene glycol, 1,2-propanediol, 1,3-propanediol, 1,2-butanediol, 1,3-butanediol, 1,4-butanediol, 1,5-pentanediol, 1,6-hexanediol, 1,8-octanediol, 1,9-nonanediol, 3-methyl-1,5-pentanediol, 3,3-dimethylolheptane, diethylene glycol, dipropylene glycol, neopentyl glycol, cyclohexane-1,4-diol, cyclohexane-1,4-dimethanol, dimer acid diol, bisphenol-A ethylene oxide adduct, bisphenol-A propylene oxide adduct, bis(β-hydroxyethyl)benzene, xylene glycol, glycerin, trimethylolpropane, and pentaerythritol. A polyester amide polyol may also be used, which is prepared by using a low-molecular weight polyamine or a low-molecular weight amino alcohol such as hexamethylenediamine, isophoronediamine or monoethanolamine as a part of the low molecular weight polyol.

Examples of the polyether polyol include: polyhydric alcohols such as ethylene glycol, diethylene glycol, propylene glycol, dipropylene glycol, butylene glycol, neopentyl glycol, glycerin, pentaerythritol, trimethylolpropane, sorbitol, and sucrose, or polyether polyols prepared by adding an alkylene oxide such as ethylene oxide or propylene oxide to any of the polyhydric alcohols. A specific usable example of the polyether polyol is a polyether polyol having an ethylene oxide content of 50 to 75 wt. % and a number average molecular weight of 2,000 to 7,000, and prepared by adding propylene oxide or ethylene oxide to polyglycerol having an average functional group number of 2 to 5. Another example of the polyether polyol is a polyether polyol prepared by ring-opening polymerization of a cyclic ether containing an alkylene oxide.

Examples of the polymer polyol include polymer polyols prepared by graft-polymerizing a vinyl compound such as acrylonitrile, styrene or alkyl (meth)acrylate to any of the polyether polyols described above.

The polyisocyanate may be aromatic, alicyclic or aliphatic. The polyisocyanate may be a divalent isocyanate having two isocyanate groups in its molecule, or a tri- or higher valent isocyanate having three or more isocyanate groups in its molecule. These polyisocyanates may be used alone or in combination.

Examples of the divalent isocyanate include: aromatic diisocyanates such as 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, xylylene diisocyanate, 3,3'-dimethyl-4,4'-biphenylene diisocyanate, and 3,3'-dimethoxy-4,4'-biphenylene diisocyanate; alicyclic diisocyanates such as cyclohexane-1,4-diisocyanate, isophorone diisocyanate, dicyclohexylmethane-4,4'-diisocyanate, and methylcyclohexane diisocyanate; and aliphatic diisocyanates such as butane-1,4-diisocyanate, hexamethylene diisocyanate, isopropylene diisocyanate, methylene diisocyanate, and lysine isocyanate.

Examples of the tri- or higher valent isocyanate include aromatic polyisocyanates such as 1-methylbenzol-2,4,6-triisocyanate, 1,3,5-trimethylbenzol-2,4,6-triisocyanate, biphenyl-2,4,4'-triisocyanate, diphenylmethane-2,4,4'-triisocyanate, methyldiphenylmethane-4,6,4-triisocyanate, 4,4'-dimethyldiphenylmethane-2,2',5,5'-tetraisocyanate, triphenylmethane-4,4',4"-triisocyanate, and polymeric MDI. Urethane prepolymers are also usable. These polyisocyanates may be used alone or in combination. For example, one of the aliphatic isocyanates and two of the aromatic isocyanates may be used in combination.

Exemplary reaction methods to be used for preparation of the urethane resin by the reaction between the polyol and the polyisocyanate include one-shot method and prepolymer method.

In the one-shot method, all the ingredients including the polyol and the polyisocyanate, and a catalyst, a foaming agent, a surfactant, and other additives to be described later are fed together, and allowed to react with each other in a single step.

In the prepolymer method, on the other hand, the polyol and the polyisocyanate are preliminarily allowed to react with each other to provide a prepolymer having isocyanate groups at its terminals, and the prepolymer is further allowed to react with the polyol in the presence of other ingredients including the catalyst, the foaming agent, the surfactant, and other additives.

The blend ratio of the polyol and the polyisocyanate for the reaction can be indicated by an isocyanate index. The isocyanate index is typically 95 to 120, preferably 100 to 115. If the isocyanate index is low, the reactivity and the crosslinking tends to be insufficient, resulting in unstable foaming and lower strain. If the isocyanate index is high, remarkable crosslinking tends to occur, resulting in contraction of the foam. Further, the exothermic reaction tends to be promoted, resulting in scorch due to a higher reaction temperature. The isocyanate index means the equivalent ratio (percentage) of the isocyanate group concentration of the polyisocyanate with respect to the total reactive hydrogen concentration of the polyol.

The catalyst is preferably used for the reaction between the polyol and the polyisocyanate. Examples of the catalyst include amine catalyst and metal catalyst. These catalysts may be used alone or in combination.

Examples of the amine catalyst include 1,4-diazabicyclo(2,2,2)octane, 1,8-diazabicyclo[5,4,0] undecene, N,N,N',N'',N''-pentamethyldiethylenetriamine, N,N-dimethylcyclohexylamine, N-methyldicyclohexylamine, N,N,N',N'-tetramethylpropylenediamine, N,N,N',N'-tetramethylhexamethylenediamine, N-ethylmorpholine, N-methylmorpholine, N,N-dimethylethanolamine, N,N-diethylethanolamine, triethylamine, triethylenediamine, diethanolamine, dimethylaminomorpholine, and tetramethylguanidine.

Examples of the metal catalyst include: organic metal compounds such as dibutyl tin dilaurate, trimethyl tin hydroxide, tetra-n-butyl tin, zinc octenoate, tin octenoate, tin octylate, cobalt naphthenate, dibutyl bismuth dilaurate, dioctyl bismuth dilaurate, bismuth 2-ethylhexanoate, bismuth naphthenate, bismuth isodecanoate, bismuth neodecanoate, bismuth laurate, bismuth maleate, bismuth stearate, bismuth oleate, bismuth linoleate, bismuth acetate, bismuth bisneodecanoate, bismuth disalicylate, bismuth digallate, and organic zirconium; and inorganic metal compounds such as stannous chloride, stannic chloride, bismuth nitrate, bismuth bromide, bismuth iodide, bismuth sulfide, inorganic zirconium, and metal zirconium. A metal catalyst including two or more metal catalysts such as zinc 2-ethylhexanoate/zirconium tetraacetylacetonate may also be used.

The urethane resin composition preferably contains the foaming agent. A foaming agent generally used for the production of the urethane resin foam substrate may be used as the foaming agent. Examples of the foaming agent include water, pentane, cyclopentane, methylene chloride, and carbon dioxide. These foaming agents may be used alone or in combination.

The urethane resin composition preferably contains the surfactant. A surfactant generally used for the production of the urethane resin foam substrate may be used as the surfactant. Examples of the surfactant include silicone compounds and nonionic surfactants.

The proportion of the surfactant to be blended is typically 0.5 to 2 parts by weight based on 100 parts by weight of the polyol.

Various additives may be added to the urethane resin composition, as long as the effects of the present disclosure are not impaired. Examples of the additives include curing accelerator, antioxidant, UV absorber, light resistance stabilizer, silane coupling agent, tackifier, wax, plasticizer, stabilizer, filler, thixotropy imparting agent, pigment, fluorescent brightener, colorant, and diluent. A thermoplastic resin other than the urethane resin may also be added to the urethane resin composition.

Exemplary methods for producing the urethane resin foam substrate from the urethane resin composition include slab method and mold method.

The urethane resin foam substrate to be used in the present disclosure can be produced by properly adjusting the formulation of the urethane resin composition containing the aforementioned ingredients so as to control the physical properties of the urethane resin foam substrate within the aforementioned ranges.

[Acrylic Resin Foam Substrate]

The acrylic resin foam substrate is produced by preparing an acrylic resin composition containing an acrylic resin prepared by polymerizing polymerization components including an alkyl (meth)acrylate monomer and, as required, a functional group-containing monomer, a polyfunctional monomer (a compound having two or more ethylenically unsaturated groups), and other copolymerizable monomer, and foaming and forming the resulting acrylic resin composition.

The alkyl (meth)acrylate monomer is a main component of the acrylic resin, and an alkyl group of the alkyl (meth)acrylate monomer typically has a carbon number of 1 to 20, preferably 1 to 14, particularly preferably 1 to 10.

Specific examples of the alkyl (meth)acrylate monomer include aliphatic alkyl (meth)acrylates such as methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, 2-ethylhexyl (meth)acrylate, octyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, lauryl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate, eicosyl (meth)acrylate; and alicyclic alkyl (meth)acrylates such as cyclohexyl (meth)acrylate and isobornyl (meth)acrylate. These may be used alone or in combination.

Of the alkyl (meth)acrylate monomers described above, n-butyl (meth)acrylate and 2-ethylhexyl (meth)acrylate are preferred from the viewpoint of copolymerizability, handling ease, and material availability.

The proportion of the alkyl (meth)acrylate monomer in the polymerization components is typically 60 to 99.5 wt. %, preferably 70 to 99 wt. %, particularly preferably 80 to 95 wt. %.

Examples of the functional group-containing monomer include hydroxyl-containing monomer, carboxyl-containing monomer, amino-containing monomer, amide-containing monomer, glycidyl-containing monomer, sulfonic acid-containing monomer, phosphoric acid-containing monomer, oxazoline-containing monomer, acetoacetyl-containing monomer, isocyanate-containing monomer, alkoxy-containing monomer, and alkoxysilyl-containing monomer. These functional group-containing monomers may be used alone or in combination.

Specific examples of the hydroxyl-containing monomer include: primary hydroxyl-containing monomers including hydroxyalkyl (meth)acrylates such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, 5-hydroxypentyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, (4-hydroxymethylcyclohexyl)

methyl (meth)acrylate, caprolactone-modified monomers such as caprolactone-modified 2-hydroxyethyl (meth)acrylate, oxyalkylene-modified monomers such as diethylene glycol (meth)acrylate and polyethylene glycol (meth)acrylate, and 2-acryloyloxyethyl-2-hydroxyethylphthalic acid; secondary hydroxyl group-containing monomers such as 2-hydroxypropyl (meth)acrylate, 2-hydroxybutyl (meth)acrylate, and 3-chloro-2-hydroxypropyl (meth)acrylate; and tertiary hydroxyl group-containing monomers such as 2,2-dimethyl-2-hydroxyethyl (meth)acrylate.

Examples of the carboxyl-containing monomer include (meth)acrylic acid, (meth)acrylic acid dimer, crotonic acid, maleic acid, maleic anhydride, fumaric acid, citraconic acid, glutaconic acid, itaconic acid, acrylamide N-glycolic acid, and cinnamic acid.

Examples of the amino-containing monomer include aminoethyl (meth)acrylate, N,N-dimethylaminoethyl (meth)acrylate, and N,N-dimethylaminopropyl (meth)acrylate.

Examples of the amide-containing monomer include (meth)acrylamide monomers such as ethoxymethyl(meth)acrylamide, n-butoxymethyl(meth)acrylamide, (meth)acryloylmorpholine, dimethyl(meth)acrylamide, diethyl(meth)acrylamide, dimethylaminopropylacrylamide, (meth)acrylamide, and N-methylol(meth)acrylamide.

Examples of the glycidyl-containing monomer include glycidyl methacrylate and allylglycidyl methacrylate.

Examples of the sulfonic acid-containing monomer include olefin sulfonic acids such as ethylenesulfonic acid, allylsulfonic acid, and methallylsulfonic acid, 2-acrylamido-2-methylolpropanesulfonic acid, and styrenesulfonic acid, and salts of these sulfonic acids.

Examples of the phosphoric acid-containing monomer include 2-hydroxyethyl acryloyl phosphate.

Examples of the oxazoline-containing monomer include 2-vinyl-2-oxazoline, 2-vinyl-5-methyl-2-oxazoline, and 2-isopropenyl-2-oxazoline.

Examples of the acetoacetyl-containing monomer include 2-(acetoacetoxy)ethyl (meth)acrylate, and allyl acetoacetate.

Examples of the isocyanate-containing monomer include 2-(meth)acryloyloxyethyl isocyanate.

Examples of the alkoxy-containing monomer include methoxyethyl (meth)acrylate, ethoxyethyl (meth)acrylate, propoxyethyl (meth)acrylate, butoxyethyl (meth)acrylate, and ethoxypropyl (meth)acrylate.

Examples of the alkoxysilyl-containing monomer include 3-(meth)acryloxypropyltrimethoxysilane, 3-(meth)acryloxypropyltriethoxysilane, 3-(meth)acryloxypropylmethyldimethoxysilane, and 3-(meth)acryloxypropylmethyldiethoxysilane.

Where the functional group-containing monomer is used, the proportion of the functional group-containing monomer in the polymerization components is typically not less than 0.5 wt. %, preferably 1 to 30 wt. %, more preferably 3 to 25 wt. %, particularly preferably 5 to 20 wt. %.

Examples of the polyfunctional monomer include 1,6-hexanediol di(meth)acrylate, ethylene glycol di(meth)acrylate, propylene glycol di(meth)acrylate, polyethylene glycol di(meth)acrylate, polypropylene glycol di(meth)acrylate, neopentyl glycol di(meth)acrylate, pentaerythritol di(meth)acrylate, trimethylolpropane tri(meth)acrylate, ethylene oxide-modified trimethylolpropane tri(meth)acrylate, pentaerythritol tri(meth)acrylate, dipentaerythritol penta(meth)acrylate, and dipentaerythritol hexa(meth)acrylate. These may be used alone or in combination.

Where the polyfunctional monomer is used, the proportion of the polyfunctional monomer in the polymerization components is typically not greater than 2 wt. %, preferably not greater than 1 wt. %.

Examples of the other copolymerizable monomer include: vinyl carboxylate monomers such as vinyl acetate, vinyl propionate, vinyl stearate, and vinyl benzoate; aromatic ring-containing monomers such as phenyl (meth)acrylate, benzyl (meth)acrylate, phenoxyethyl (meth)acrylate, phenyldiethylene glycol (meth)acrylate, 2-hydroxy-3-phenoxypropyl (meth)acrylate, styrene, and α-methylstyrene; biphenyloxy structure-containing (meth)acrylate monomers such as biphenyloxyethyl (meth)acrylate; alkoxy- or oxyalkylene-containing monomers such as 2-methoxyethyl (meth)acrylate, 2-ethoxyethyl (meth)acrylate, methoxydiethylene glycol (meth)acrylate, ethoxydiethylene glycol (meth)acrylate, methoxypolyethylene glycol (meth)acrylate, and polypropylene glycol mono(meth)acrylate; and acrylonitrile, methacrylonitrile, vinyl chloride, vinylidene chloride, alkyl vinyl ethers, vinyltoluene, vinylpyridine, vinylpyrrolidone, dialkyl itaconates, dialkyl fumarates, allyl alcohol, acrylic chloride, methyl vinyl ketone, allyltrimethylammonium chloride, and dimethylallyl vinyl ketone. These may be used alone or in combination.

Where the other copolymerizable monomer is used, the proportion of the other copolymerizable monomer in the polymerization components is typically not greater than 40 wt. %, preferably not greater than 30 wt. %, more preferably not greater than 25 wt. %.

The acrylic resin is prepared by polymerizing the alkyl (meth)acrylate monomer and, as required, selectively with the functional group-containing monomer, the polyfunctional monomer, and the other copolymerizable monomer. For the polymerization, a conventionally known polymerization method such as solution radical polymerization method, suspension polymerization method, bulk polymerization method, emulsion polymerization method, photopolymerization method or radiation polymerization method may be typically used.

In the polymerization for the preparation of the acrylic resin, a polymerization initiator is preferably used according to the polymerization method, the polymerization mode, and the like. Generally known polymerization initiators may be used alone or in combination as the polymerization initiator.

The acrylic resin prepared by any of the polymerization methods described above typically has a glass transition temperature (Tg) of −70° C. to −10° C., preferably −70° C. to −20° C., particularly preferably −70° C. to −30° C., more preferably −70° C. to −40° C., especially preferably −65° C. to −50° C.

The glass transition temperature (Tg) of the acrylic resin is measured by using a differential scanning calorimeter DSC Q2000 available from TA Instruments, Inc. The measurement temperature range is −80° C. to −40° C., and the temperature elevating rate is 5° C./minute.

The acrylic resin composition may contain a crosslinking agent. A crosslinking agent generally known in the field of the acrylic adhesive agent may be used as the crosslinking agent. Examples of the crosslinking agent include epoxy crosslinking agent, isocyanate crosslinking agent, silicone crosslinking agent, oxazoline crosslinking agent, aziridine crosslinking agent, silane crosslinking agent, alkyl etherified melamine crosslinking agent, and metal chelate crosslinking agent. These crosslinking agents may be used alone or in combination.

The acrylic resin composition may contain a filler. With the filler contained in the acrylic resin composition, the shear strength of the acrylic resin foam substrate can be increased, so that the peeling strength of the adhesive tape to be peeled from an adherend tends to be improved. Further, the excessive deformation of the adhesive tape tends to be suppressed, and the flexibility and the cohesiveness of the entire adhesive tape can be easily properly balanced.

Various particulate substances are usable as the filler. Exemplary materials for the particulate substances include: inorganic materials including metals such as copper, nickel, aluminum, chromium, iron, and stainless steel, metal oxides such as alumina and zirconia, carbides such as silicon carbide, boron carbide, and nitrogen carbide, nitrides such as aluminum nitride, silicon nitride, and boron nitride, calcium carbide, calcium carbonate, aluminum hydroxide, glass, and silica; polymers such as polystyrenes, acrylic resins (e.g., polymethyl methacrylates and the like), phenol resins, benzoguanamine resins, urea resins, silicone resins, polyesters, polyurethanes, polyethylenes, polypropylenes, polyamides (e.g., nylons and the like), polyimides, and polyvinylidene chlorides; and natural material particles such as volcanic ash and sand. These may be used alone or in combination.

The appearance or the particle shape of such a particulate substance may be spherical, flaky or irregular. The particle structure of the particulate substance is not particularly limited, but may be, for example, a dense structure, a porous structure, a hollow structure or the like.

Particularly, the filler preferably includes a particulate substance having a hollow structure (hereinafter referred to as "hollow particles"), and more preferably include hollow particles made of an inorganic material. Examples of the hollow particles include glass balloons such as hollow glass balloons; hollow balloons made of a metal compound such as hollow alumina balloons; and hollow balloons made of a ceramic material such as hollow ceramic balloons.

Commercially available examples of the hollow glass balloons include GLASS MICROBALLOON, FUJIBALLOON H-40, and FUJIBALLOON H-35 (trade names) available from Fuji Silysia Chemical Ltd., CELLSTAR Z-20, CELLSTAR Z-27, CELLSTAR CZ-31T, CELLSTAR Z-36, CELLSTAR Z-39, CELLSTAR T-36, and CELLSTAR PZ-6000 (trade names) available from Tokai Kogyo Co., Ltd., SYLUX FINEBALLOON (trade name) available from Fine Balloon Co., Ltd., Q-CEL (registered trade name) 5020, Q-CEL (registered trade name) 7014, SPHERICEL (registered trade name) 110P8, SPHERICEL (registered trade name) 25P45, SPHERICEL (registered trade name) 34P30, SPHERICEL (registered trade name) 60P18 (trade names) available from Potters Ballotini Co., Ltd., and SUPERBALLOON BA-15 and SUPERBALLOON 732C (trade names) available from Showa Chemical Industry Co., Ltd.

The average particle diameter of the hollow particles to be used is not particularly limited but, for example, is typically 1 to 500 μm, preferably 5 to 400 μm, more preferably 10 to 300 μm, still more preferably 10 to 200 μm, especially preferably 10 to 150 μm.

The average particle diameter of the hollow particles is typically not greater than 50%, preferably not greater than 30%, more preferably not greater than 10%, of the thickness of the foam sheet.

The specific gravity of the hollow particles is not particularly limited but, for example, is typically 0.1 to 1.8 g/cm$^3$, preferably 0.1 to 1.5 g/cm$^3$, more preferably 0.1 to 0.5 g/cm$^3$, especially preferably 0.2 to 0.5 g/cm$^3$, in consideration of uniform dispersibility, mechanical strength, and the like.

The proportion of the hollow particles to be used is not particularly limited but, for example, may be 1 to 70 vol. %, and is preferably 5 to 50 vol. %, particularly preferably 10 to 40 vol. %, based on the volume of the entire foam sheet.

The filler typically has an average particle diameter of, for example, 1 to 500 μm, preferably 5 to 400 μm, more preferably 10 to 300 μm, particularly preferably 10 to 150 μm. The average particle diameter of the filler is typically not greater than 50%, preferably not greater than 30%, particularly preferably not greater than 10%, of the thickness of the acrylic resin foam substrate.

The proportion of the filler to be blended is typically, for example, 1 to 70 vol. %, preferably 5 to 50 vol. %, particularly preferably 10 to 40 vol. %, based on the volume of the entire acrylic resin foam substrate. For improvement of the peel strength, the proportion of the filler to be blended is not less than 15 vol. %, preferably not less than 20 vol. %, more preferably not less than 30 vol. %, based on the volume of the entire acrylic resin foam substrate.

The acrylic resin composition may contain additives, as long as the effects of the present disclosure are not impaired. Examples of the additives include tackifier such as acrylic oligomer, thermoplastic resin other than the acrylic resin, plasticizer, softening agent, colorant (e.g., pigment, dye or the like), antioxidant, leveling agent, stabilizer, and preservative. These additives may be used alone or in combination.

As described above, the acrylic resin foam substrate is produced by foaming and forming the acrylic resin composition. A known method may be used for the foam-forming.

Exemplary methods for foaming and forming the acrylic resin composition include a method in which a foaming gas is preliminarily incorporated in the acrylic resin composition and the resulting acrylic resin composition is cured, and a method in which a foaming agent is added to the acrylic resin composition and bubbles are formed from the foaming agent in the acrylic resin composition.

In the method in which the acrylic resin composition preliminarily incorporated with the foaming gas is cured, a known gas mixing method may be used for preparing the acrylic resin composition preliminarily incorporated with the foaming gas.

In the method in which bubbles are formed from the foaming agent in the acrylic resin composition containing the foaming agent, a known foaming agent for the acrylic resin foam substrate may be used as the foaming agent. A preferred example of the foaming agent is thermally expandable microspheres.

From the viewpoint of the incorporation of the foaming gas and the stability of the bubbles, a surfactant may be added to the acrylic resin composition incorporated with the foaming gas or the acrylic resin composition containing the foaming agent. Examples of the surfactant include ionic surfactant, hydrocarbon surfactant, silicone surfactant, and fluorine-containing surfactant, which may be used alone or in combination. Of these surfactants, the fluorine-containing surfactant is preferred, and a fluorine-containing surfactant which contains an oxyalkylene group (e.g., C2 to C3 oxyalkylene group) and a fluorinated hydrocarbon group in its molecule is preferred.

The proportion of the surfactant is typically 0.01 to 3 parts by weight on a solid basis based on 100 parts by weight of the acrylic resin.

The acrylic resin foam substrate can be produced by applying the acrylic resin composition incorporated with the foaming gas or the acrylic resin composition containing the foaming agent on a predetermined surface, and curing the applied acrylic resin composition.

Exemplary methods for the curing include a heating method, and an active energy radiation applying method (e.g., ultraviolet radiation applying method).

The acrylic resin foam substrate to be used in the present disclosure can be produced by properly adjusting the formulation of the acrylic resin composition containing the aforementioned ingredients so as to control the physical properties of the acrylic resin foam substrate within the aforementioned ranges.

<Polyester Adhesive Agent Composition [II]>

A feature of the polyester adhesive agent composition [II] to be used in the present disclosure is that a polyester resin (A) contained in the polyester adhesive agent composition [II] has a structural unit derived from a polyol and a structural unit derived from a polyvalent carboxylic acid compound containing an aromatic structure-containing compound in a proportion within a predetermined range, and has a weight average molecular weight within a predetermined range.

The polyester adhesive agent composition [II] to be used in the present disclosure contains the polyester resin (A) as an essential component, and preferably further contains at least one selected from the group consisting of a hydrolysis inhibitor (B), an urethanization catalyst (C), and a cross-linking agent (D), more preferably all the components (B) to (D).

The components of the polyester adhesive agent composition [II] will hereinafter be described in turn.

[Polyester Resin (A)]

The polyester resin (A) is typically prepared by copolymerization of copolymerization components including the polyvalent carboxylic acid compound (a1) and the polyol (a2) as ingredients. Thus, the polyester resin (A) has a resin formulation including the structural unit derived from the polyvalent carboxylic acid compound (a1) and the structural unit derived from the polyol (a2).

In the present disclosure, the term "carboxylic acid compound" is intended to include carboxylic acid derivatives such as carboxylic acid salt, carboxylic acid anhydride, carboxylic acid halide, and carboxylic acid ester in addition to carboxylic acid.

The polyester resin (A) to be used in the present disclosure is preferably prepared by copolymerization of copolymerization components including a hydrogenated polybutadiene structure-containing compound (a3) from the viewpoint of the adherence to the polyolefin resin foam substrate, the urethane resin foam substrate or the acrylic resin foam substrate, and the adhesiveness to a polyolefin adhered. The copolymerization with the hydrogenated polybutadiene structure-containing compound (a3) allows the polyester resin (A) to contain a structural unit derived from the hydrogenated polybutadiene structure-containing compound (a3). The hydrogenated polybutadiene structure-containing compound (a3) is preferably contained as at least one selected from the group consisting of the polyvalent carboxylic acid compound (a1) and the polyol (a2) which are ingredients of the polyester resin (A).

[Polyvalent Carboxylic Acid Compound (a1)]

The polyvalent carboxylic acid compound (a1) to be used as an ingredient of the polyester resin (A) is a divalent carboxylic acid compound, or a tri- or higher valent carboxylic acid compound. From the viewpoint of stable preparation of the polyester resin (A), the divalent carboxylic acid compound is preferably used.

Examples of the divalent carboxylic acid compound include: aliphatic dicarboxylic acid compounds such as malonic acid compound, dimethylmalonic acid compound, succinic acid compound, glutaric acid compound, adipic acid compound, trimethyladipic acid compound, pimelic acid compound, 2,2-dimethylglutaric acid compound, azelaic acid compound, sebacic acid compound, fumaric acid compound, maleic acid compound, itaconic acid compound, thiodipropionic acid compound, diglycolic acid compound, 1,9-nonanedicarboxylic acid compound; aromatic dicarboxylic acid compounds such as phthalic acid compound, terephthalic acid compound, isophthalic acid compound, benzylmalonic acid compound, diphenic acid compound, 4,4'-oxydibenzoic acid compound, and naphthalenedicarboxylic acid compounds such as 1,8-naphthalenedicarboxylic acid compound, 2,3-naphthalenedicarboxylic acid compound, and 2,7-naphthalenedicarboxylic acid compound; and alicyclic dicarboxylic acid compounds such as 1,3-cyclopentanedicarboxylic acid compound, 1,2-cyclohexanedicarboxylic acid compound, 1,3-cyclopentanedicarboxylic acid compound, 1,4-cyclohexanedicarboxylic acid compound, 2,5-norbornanedicarboxylic acid compound, and adamantanedicarboxylic acid compound.

Examples of the tri- or higher valent carboxylic acid compound include trimellitic acid compound, pyromellitic acid compound, adamantanetricarboxylic acid compound, and trimesic acid compound.

These polyvalent carboxylic acid compounds may be used alone or in combination as the polyvalent carboxylic acid compound (a1).

Of the aforementioned polyvalent carboxylic acid compounds, the polyvalent carboxylic acid compound (a1) preferably includes an aromatic polyvalent carboxylic acid compound, particularly an asymmetric aromatic polyvalent carboxylic acid compound (a1-1), in order to reduce the crystallinity of the polyester resin (A). Examples of the asymmetric aromatic polyvalent carboxylic acid compound (a1-1) include phthalic acid compound, isophthalic acid compound, 1,8-naphthalenedicarboxylic acid compound, 2,3-naphthalenedicarboxylic acid compound, and 2,7-naphthalenedicarboxylic acid compound. Particularly, the isophthalic acid compound is preferably used from the viewpoint of the reactivity.

The proportion of the aromatic polyvalent carboxylic acid compound, particularly the asymmetric aromatic polyvalent carboxylic acid compound (a1-1), is preferably not greater than 80 mol %, particularly preferably 1 to 80 mol %, more preferably 2 to 70 mol %, still more preferably 3 to 60 mol %, especially preferably 5 to 40 mol %, based on the overall amount of the polyvalent carboxylic acid compound (a1). If the proportion of the aromatic polyvalent carboxylic acid compound is excessively small, the resin tends to be crystallized, resulting in insufficient adhesive properties. If the proportion of the aromatic polyvalent carboxylic acid compound is excessively great, the compatibility and the initial adherence (tackiness) tend to be poorer.

Of the polyvalent carboxylic acid compounds described above, the polyvalent carboxylic acid compound (a1) preferably includes an aliphatic polyvalent carboxylic acid compound (a1-2) having an odd carbon number in order to reduce the crystallinity of the polyester resin (A) from another viewpoint. Examples of the aliphatic polyvalent carboxylic acid compound (a1-2) having an odd carbon number include malonic acid compound, glutaric acid compound, pimelic acid compound, azelaic acid compound, and 1,9-nonanedicarboxylic acid compound. Particularly, the azelaic acid compound is preferably used.

The proportion of the aliphatic polyvalent carboxylic acid compound (a1-2) having an odd carbon number is preferably 5 to 100 mol % based on the overall amount of the polyvalent carboxylic acid compound (a1). Where the solution transparency is an important factor, the proportion of the aliphatic polyvalent carboxylic acid compound (a1-2) having an odd carbon number is preferably 5 to 95 mol %, particularly preferably 10 to 90 mol %, more preferably 20 to 85 mol %, especially preferably 30 to 80 mol %, based on the overall amount of the polyvalent carboxylic acid compound (a1). If the proportion of the aliphatic polyvalent carboxylic acid compound (a1-2) having an odd carbon number is excessively small, the resin tends to be crystallized, resulting in insufficient adhesive properties.

In the present disclosure, the asymmetric aromatic polyvalent carboxylic acid compound (a1-1) and the aliphatic polyvalent carboxylic acid compound are preferably used in combination as the polyvalent carboxylic acid compound (a1) from the viewpoint of adhesive properties. The ratio (molar ratio) between the asymmetric aromatic polyvalent carboxylic acid compound (a1-1) and the aliphatic polyvalent carboxylic acid compound is (Asymmetric aromatic polyvalent carboxylic acid compound (a1-1))/(Aliphatic polyvalent carboxylic acid compound)=1/99 to 70/30, particularly preferably 5/95 to 50/50, more preferably 10/90 to 30/70.

The tri- or higher valent carboxylic acid compound may be used in order to increase the number of branches in the polyester resin (A). Particularly, the trimellitic acid compound is preferably used because the gelation is less liable to occur.

The proportion of the tri- or higher valent carboxylic acid compound is preferably not greater than 10 mol %, particularly preferably 0.1 to 5 mol %, based on the overall amount of the polyvalent carboxylic acid compound (a1) in order to increase the cohesive force of the adhesive agent. If the proportion of the tri- or higher valent carboxylic acid compound is excessively great, the gelation is liable to occur in the production of the polyester resin (A).

[Polyol (a2)]

The polyol (a2) to be used as an ingredient of the polyester resin (A) is a divalent alcohol, or a tri- or higher valent polyol.

Examples of the divalent alcohol include: aliphatic diols such as ethylene glycol, diethylene glycol, triethylene glycol, propylene glycol, dipropylene glycol, 1,3-propanediol, 2,4-dimethyl-2-ethylhexanoate-1,3-diol, 2-methyl-1,3-propanediol, 2,2-dimethyl-1,3-propanediol (neopentyl glycol), 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 3-methyl-1,5-pentanediol, and 2,2,4-trimethyl-1,6-hexanediol; alicyclic diols such as 1,2-cyclohexanedimethanol, 1,3-cyclohexanedimethanol, 1,4-cyclohexanedimethanol, spiroglycol, tricyclodecanedimethanol, adamantanediol, and 2,2,4-tetramethyl-1,3-cyclobutanediol; aromatic diols such as 4,4'-thiodiphenol, 4,4'-methylene diphenol, bisphenol, bisphenol fluorene, 4,4'-dihydroxybiphenyl, o-, m-, and p-dihydroxybenzenes, 2,5-naphthalene diol, and p-xylene diol; and ethylene oxide adducts and propylene oxide adducts of any of the aforementioned diols.

Other examples of the divalent alcohol include fatty acid esters derived from castor oil, dimer diols derived from oleic acid, erucic acid, and the like, and glycerol monostearate.

Examples of the tri- or higher valent polyol include pentaerythritol, dipentaerythritol, tripentaerythritol, glycerin, trimethylolpropane, trimethylolethane, 1,3,6-hexanetriol, and adamantanetriol.

These polyols may be used alone or in combination as the polyol (a2).

The polyol (a2) preferably includes a branched structure-containing polyol (a2-1) in order to increase the number of branches and reduce the crystallinity. Examples of the branched structure-containing polyol (a2-1) include neopentyl glycol, 2-methyl-1,3-propanediol, 2-methyl-2-ethyl-1,3-propanediol, 2,2-diethyl-1,3-propanediol, 2-methyl-2-propyl-1,3-propanediol, 2-butyl-2-ethyl-1,3-propanediol, 3-methyl-1,5-pentanediol, 2-methyl-2,4-pentanediol, 2,4-diethyl-1,5-pentanediol, 1,3,5-trimethyl-1,3-pentanediol, and 2-methyl-1,6-hexanediol. Of these, neopentyl glycol is particularly preferred.

The branched structure-containing polyol (a2-1) excludes a hydrogenated polybutadienepolyol (a3-2) to be described later.

The proportion of the branched structure-containing polyol (a2-1) is preferably 5 to 99 mol %, particularly preferably 10 to 95 mol %, more preferably 30 to 90 mol %, based on the overall amount of the polyol (a2). If the proportion of the branched structure-containing polyol (a2-1) is excessively small, the resin tends to have insufficient adhesive properties due to crystallization. If the proportion of the branched structure-containing polyol (a2-1) is excessively great, the production of the polyester resin (A) tends to require a longer reaction period.

On the other hand, the polyol (a2) preferably includes a linear polyol (a2-2), more preferably a C2 to C40 linear polyol, from the viewpoint of the reactivity. Examples of the linear polyol (a2-2) include aliphatic glycols such as ethylene glycol, 1,3-propanediol, 1,4-butanediol, 1,5-pentanediol, 1,6-hexanediol, diethylene glycol, dipropylene glycol, 1,9-nonanediol, 1,10-decanediol, and 1,12-dodecanediol. Of these, 1,4-butanediol is particularly preferred.

The proportion of the linear polyol (a2-2) is preferably 1 to 100 mol %, more preferably 3 to 95 mol %, particularly preferably 5 to 90 mol %, still more preferably 10 to 80 mol %, especially preferably 15 to 60 mol %, based on the overall amount of the polyol (a2). If the proportion of the linear polyol (a2-2) is excessively small, it tends to be difficult to ensure stable resin preparation.

The polyol (a2) may include a tri- or higher valent polyol in order to increase the number of branches in the polyester resin (A). Examples of the tri- or higher valent polyol include pentaerythritol, dipentaerythritol, tripentaerythritol, glycerin, trimethylolpropane, trimethylolethane, 1,3,6-hexanetriol, and adamantanetriol.

The proportion of the tri- or higher valent polyol is preferably not greater than 20 mol %, more preferably 0.1 to 10 mol %, particularly preferably 0.5 to 5 mol %, based on the overall amount of the polyol (a2). If the proportion of the tri- or higher valent polyol is excessively great, it tends to be difficult to prepare the polyester resin (A).

The blend ratio between the polyvalent carboxylic acid compound (a1) and the polyol (a2) is preferably such that the polyol (a2) is present in 1 to 3 equivalents per equivalent of the polyvalent carboxylic acid compound (a1), particularly preferably 1.1 to 2 equivalents per equivalent of the polyvalent carboxylic acid compound (a1). If the blend ratio of the polyol (a2) is excessively small, it tends to be difficult to increase the molecular weight due to an increased acid value. If the blend ratio of the polyol (a2) is excessively great, the yield tends to be reduced.

[Hydrogenated Polybutadiene Structure-Containing Compound (a3)]

The polyester resin (A) to be used in the present disclosure preferably has the structural unit derived from the hydrogenated polybutadiene structure-containing compound (a3) as described above. The hydrogenated polybutadiene structure-containing compound (a3) may be blended as an ingredient of the polyester resin (A), but is preferably contained as at least one selected from the group consisting of the polyvalent carboxylic acid compound (a1) and the polyol (a2) in order to achieve the object of the present disclosure.

The hydrogenated polybutadiene structure-containing compound (a3) contained in the polyvalent carboxylic acid compound (a1) is hereinafter referred to as hydrogenated polybutadiene structure-containing polyvalent carboxylic acid compound (a3-1), and the hydrogenated polybutadiene structure-containing compound (a3) contained in the polyol (a2) is hereinafter referred to as hydrogenated polybutadienepolyol (a3-2).

The proportion of the hydrogenated polybutadiene structure-containing compound (a3) is preferably 0.001 to 15 mol %, more preferably 0.005 to 10 mol %, particularly preferably 0.01 to 5 mol %, especially preferably 0.02 to 1 mol %, based on the total amount of the copolymerization components of the polyester resin (A). If the proportion of the hydrogenated polybutadiene structure-containing compound (a3) is excessively small, the adhesiveness to the polyolefin adherend tends to be reduced. If the proportion of the hydrogenated polybutadiene structure-containing compound (a3) is excessively great, the compatibility tends to be reduced.

Examples of the hydrogenated polybutadiene structure-containing polyvalent carboxylic acid compound (a3-1) contained in the polyvalent carboxylic acid compound (a1) include polybutadiene polyvalent carboxylic acid compounds such as 1,2-polybutadienedicarboxylic acid compound, 1,4-polybutadienedicarboxylic acid compound, and 1,4-polyisoprenedicarboxylic acid compound, and saturated hydrocarbon polyvalent carboxylic acid compounds prepared by saturating the double bonds of any of these polybutadiene polyvalent carboxylic acid compounds with hydrogen, a halogen or the like. Other usable examples of the hydrogenated polybutadiene structure-containing polyvalent carboxylic acid compound (a3-1) include polyvalent carboxylic acid compounds prepared by copolymerizing a polybutadiene polyvalent carboxylic acid compound with an olefin compound such as styrene, ethylene, vinyl acetate or acrylic acid ester, and polyvalent carboxylic acid compounds prepared by hydrogenating any of these polyvalent carboxylic acid compounds. Particularly, a hydrocarbon polybutadiene polyvalent carboxylic acid compound having a higher saturation degree is preferred. The hydrogenated polybutadiene structure-containing polyvalent carboxylic acid compound (a3-1) preferably has a number average molecular weight of 300 to 30,000, particularly preferably 500 to 10,000, more preferably 800 to 5,000, and preferably has an average carboxyl functional group number of 1.5 to 3.

From the viewpoint of excellent adhesiveness to the polyolefin adherend, the hydrogenated polybutadiene structure of the hydrogenated polybutadiene structure-containing polyvalent carboxylic acid compound (a3-1) preferably has a 1,2-bond content that is higher than a 1,4-bond content. The hydrogenated polybutadiene structure preferably has a 1,2-bond content of 25 to 100%, particularly preferably 50 to 100%, especially preferably 75 to 100%.

The proportion of the hydrogenated polybutadiene structure-containing polyvalent carboxylic acid compound (a3-1) is preferably 0.001 to 15 mol %, more preferably 0.005 to 10 mol %, particularly preferably 0.01 to 5 mol %, especially preferably 0.02 to 1 mol %, based on the total amount of the copolymerization components of the polyester resin (A). If the proportion of the hydrogenated polybutadiene structure-containing polyvalent carboxylic acid compound (a3-1) is excessively small, the adhesiveness to the polyolefin adherend tends to be reduced. If the proportion of the hydrogenated polybutadiene structure-containing polyvalent carboxylic acid compound (a3-1) is excessively great, the compatibility tends to be reduced.

The ingredients of the polyester resin (A) more preferably include the hydrogenated polybutadiene structure-containing compound (a3) as the polyol (a2). Particularly, the hydrogenated polybutadiene structure-containing compound (a3) is the hydrogenated polybutadienepolyol (a3-2) contained in the polyol (a2).

Examples of the hydrogenated polybutadienepolyol (a3-2) include polybutadienepolyols such as 1,2-polybutadienepolyol, 1,4-polybutadienepolyol, and 1,4-polyisoprenepolyol, and saturated hydrocarbon polyols prepared by saturating the double bonds of any of these polybutadienepolyols with hydrogen, a halogen or the like. Other usable examples of the hydrogenated polybutadienepolyol (a3-2) include polyols prepared by copolymerizing a polybutadienepolyol with an olefin compound such as styrene, ethylene, vinyl acetate or an acrylic ester, and polyols prepared by hydrogenating any of these polyols. Particularly, a hydrocarbon polybutadienepolyol having a higher saturation degree is preferred. The hydrogenated polybutadienepolyol (a3-2) preferably has a number average molecular weight of 300 to 30,000, particularly preferably 500 to 10,000, more preferably 800 to 5,000, and preferably has an average hydroxyl functional group number of 1.5 to 3.

From the viewpoint of excellent adhesiveness to the polyolefin adherend, the hydrogenated polybutadiene structure of the hydrogenated polybutadienepolyol (a3-2) preferably has a 1,2-bond content that is higher than a 1,4-bond content. The hydrogenated polybutadiene structure preferably has a 1,2-bond content of 25 to 100%, particularly preferably 50 to 100%, especially preferably 75 to 100%.

The proportion of the hydrogenated polybutadienepolyol (a3-2) is preferably 0.001 to 15 mol %, more preferably 0.005 to 10 mol %, particularly preferably 0.01 to 5 mol %, especially preferably 0.02 to 1 mol %, based on the total amount of the copolymerization components of the polyester resin (A). If the proportion of the hydrogenated polybutadienepolyol (a3-2) is excessively small, the adhesiveness to the polyolefin adherend tends to be reduced. If the proportion of the hydrogenated polybutadienepolyol (a3-2) is excessively great, the compatibility tends to be reduced.

The polyester resin (A) to be used in the present disclosure is prepared by properly selecting the polyvalent carboxylic acid compound (a1) and the polyol (a2), and polymerizing the polyvalent carboxylic acid compound (a1) and the polyol (a2) through a polycondensation reaction in the presence of a catalyst by a known method.

The polycondensation reaction is carried out after an esterification reaction.

In the esterification reaction, a catalyst is used. Specific examples of the catalyst include titanium-containing catalysts such as tetraisopropyl titanate and tetrabutyl titanate, antimony-containing catalysts such as antimony trioxide, germanium-containing catalysts such as germanium dioxide, and other catalysts such as zinc acetate, manganese acetate, and dibutyl tin oxide, which may be used alone or in combination. Of these, antimony trioxide, tetrabutyl titanate, germanium dioxide, and zinc acetate are preferred from the viewpoint of the balance between the catalytic activity and the hue of the catalyst.

The proportion of the catalyst is preferably 1 to 10,000 ppm, particularly preferably 10 to 5,000 ppm, more preferably 20 to 3,000 ppm, based on the total amount of the copolymerization components. If the proportion of the catalyst is excessively small, the polymerization reaction tends to insufficiently proceed. If the proportion of the catalyst is excessively great, a side reaction is liable to occur without a reaction period reducing effect or the like.

In the esterification reaction, the reaction temperature is preferably 200° C. to 300° C., particularly preferably 210° C. to 280° C., more preferably 220° C. to 260° C. If the reaction temperature is excessively low, the reaction tends to insufficiently proceed. If the reaction temperature is excessively high, a side reaction such as decomposition is liable to occur. The reaction is typically carried out under normal pressure.

After the esterification reaction, the polycondensation reaction is carried out.

In the polycondensation reaction, the same catalyst as used for the esterification reaction is further added in the same proportion to the reaction system. The polycondensation reaction is preferably allowed to proceed at a reaction temperature of 220° C. to 280° C., particularly preferably 230° C. to 270° C., while the pressure is gradually reduced to a final pressure of not higher than 5 hPa in the reaction system. If the reaction temperature is excessively low, the reaction tends to insufficiently proceed. If the reaction temperature is excessively high, a side reaction such as decomposition is liable to occur.

Thus, the polyester resin (A) to be used in the present disclosure is prepared. The polyester resin (A) has the structural unit derived from the polyol, and the structural unit derived from the polyvalent carboxylic acid compound containing the aromatic structure-containing compound in a proportion within the predetermined range, and has a weight average molecular weight within the predetermined range.

The proportion of the aromatic structure-containing compound contained in the polyvalent carboxylic acid compound for the polyester resin (A) is not greater than 80 mol %, preferably 2 to 70 mol %, particularly preferably 3 to 60 mol %, more preferably 5 to 40 mol %, from the viewpoint of the adherence to the substrate [I] and the adhesiveness to the polyolefin adherend. If the proportion of the aromatic structure-containing compound contained in the polyvalent carboxylic acid compound falls outside the above range, the adherence to the substrate [I] is liable to be reduced.

The polyester resin (A) preferably further includes the structural unit derived from the hydrogenated polybutadiene structure-containing compound (a3). The proportion of the structural unit derived from the hydrogenated polybutadiene structure-containing compound (a3) in the polyester resin (A) is preferably 0.01 to 50 wt. %, more preferably 0.1 to 30 wt. %, particularly preferably 0.2 to 20 wt. %, more preferably 0.3 to 10 wt. %. Where the proportion of the structural unit derived from the hydrogenated polybutadiene structure-containing compound (a3) falls within the above range, the adherence to the substrate [I] tends to be excellent.

In the polyester resin (A), the structural unit derived from the hydrogenated polybutadiene structure-containing compound (a3) is preferably included as at least one selected from the group consisting of the structural unit derived from the polyvalent carboxylic acid compound (a1) and the structural unit derived from the polyol (a2), and is more preferably included as the structural unit derived from the polyol (a2) from the viewpoint of the adhesiveness to the polyolefin adherend.

Where the structural unit derived from the hydrogenated polybutadienepolyol (a3-2) is included as the structural unit derived from the polyol (a2), the structural unit derived from the hydrogenated polybutadienepolyol (a3-2) is preferably present in a proportion of 0.001 to 30 mol %, more preferably 0.01 to 20 mol %, particularly preferably 0.03 to 10 mol %, especially preferably 0.04 to 5 mol %, 0.05 to 2 mol %, 0.1 to 1 mol %, in the structural unit derived from the polyol (a2) from the viewpoint of the compatibility.

The polyester resin (A) typically has the structural unit derived from the polyvalent carboxylic acid compound (a1) and the structural unit derived from the polyol (a2). Where the structural unit derived from the aromatic polyvalent carboxylic acid compound, particularly the asymmetric aromatic polyvalent carboxylic acid compound (a1-1), is included as the structural unit derived from the polyvalent carboxylic acid compound (a1), the structural unit derived from the asymmetric aromatic polyvalent carboxylic acid compound (a1-1) is preferably present in a proportion of not greater than 80 mol %, particularly preferably 2 to 70 mol %, more preferably 3 to 60 mol %, especially preferably 5 to 40 mol %, in the structural unit derived from the polyvalent carboxylic acid compound (a1).

Where the structural unit derived from the aliphatic polyvalent carboxylic acid compound (a1-2) having an odd carbon number is included as the structural unit derived from the polyvalent carboxylic acid compound (a1), the structural unit derived from the aliphatic polyvalent carboxylic acid compound (a1-2) having an odd carbon number is preferably present in a proportion of 5 to 100 mol %, particularly preferably 10 to 100 mol %, more preferably 20 to 100 mol %, especially preferably 30 to 100 mol %, in the structural unit derived from the polyvalent carboxylic acid compound (a1).

Where the structural unit derived from the branched structure-containing polyol (a2-1) is included as the structural unit derived from the polyol (a2), the structural unit derived from the branched structure-containing polyol (a2-1) is preferably present in a proportion of 5 to 99 mol %, particularly preferably 10 to 95 mol %, more preferably 30 to 90 mol %, in the structural unit derived from the polyol (a2) in order to reduce the crystallinity.

Where the structural unit derived from the linear polyol (a2-2) is included as the structural unit derived from the polyol (a2), the structural unit derived from the linear polyol (a2-2) is preferably present in a proportion of 3 to 95 mol %, more preferably 5 to 90 mol %, particularly preferably 10 to 80 mol %, especially preferably 15 to 60 mol %, in the structural unit derived from the polyol (a2) from the viewpoint of stable resin preparation.

The proportions (composition ratios) of the respective structural units of the polyester resin (A) may be determined, for example, by NMR.

The polyester resin (A) typically has an ester bond concentration of 1 to 15 mmol/g, preferably 1.5 to 14 mmol/g, particularly preferably 2 to 13 mmol/g, more preferably 3 to 12 mmol/g, still more preferably 4 to 11 mmol/g, especially preferably 5 to 10.5 mmol/g, preferably 6 to 10 mmol/g, most preferably 7 to 9.5 mmol/g. If the ester bond concentration is excessively low, the storage elastic modulus tends to be reduced, resulting in lower cohesive force. If the ester bond concentration is excessively high, the storage elastic modulus tends to be increased, resulting in lower adherence.

The ester bond concentration of the polyester resin (A) is calculated as the mol number (mmol) of the acid component with respect to the weight (g) of the resulting resin.

Ester bond concentration (mmol/g)=(Mol number of acid component)/(Weight of resulting resin)

The weight average molecular weight of the polyester resin (A) is 5,000 to 300,000, preferably, 8,000 to 200,000, particularly preferably 10,000 to 150,000, more preferably 20,000 to 100,000, from the viewpoint of the cohesive force of the adhesive agent. If the weight average molecular weight of the polyester resin (A) is excessively small, the adhesive agent is liable to have an insufficient cohesive force and, hence, to be poorer in heat resistance and mechanical strength. If the weight average molecular weight of the polyester resin (A) is excessively great, it will be difficult to properly prepare the polyester resin (A) due to gelation in the production. Further, the adherence to the substrate is liable to be reduced.

In the present disclosure, the weight average molecular weight is determined based on standard polystyrene molecular weight through measurement by high-performance liquid chromatography (HLC-8320GPC available from Tosoh Corporation) with the use of two columns TSKgel SuperMultipore HZ-M (each having an exclusion limit molecular weight of $2 \times 10^6$, a theoretical plate number of 16,000 per column, and filled with a column packing material of styrene-divinylbenzene copolymer having a particle diameter of 4 μm) connected in series. The number average molecular weight can also be determined in the same manner as described above.

The polyester resin (A) preferably has a glass transition temperature (Tg) of −80° C. to 20° C., particularly preferably −70° C. to 15° C., more preferably −60° C. to 10° C., from the viewpoint of adhesive properties. If the glass transition temperature (Tg) of the polyester resin (A) is excessively high, the adhesive agent tends to have no flexibility and lower initial adhesiveness, and fail to exhibit a sufficient adhesive force when being pressed by a finger pressure, thereby reducing the working efficiency. If the glass transition temperature (Tg) of the polyester resin (A) is excessively low, the adhesive agent tends to have a lower cohesive force, so that the adhesive tape is susceptible to deformation, resulting in poorer appearance.

The glass transition temperature (Tg) of the polyester resin (A) is measured with the use of a differential scanning calorimeter DSC Q2 available from TA Instruments, Inc.

The measurement temperature range is −90° C. to 100° C., and the temperature elevating rate is 10° C./minute.

From the viewpoint of the storage stability, the polyester resin (A) is preferably free from crystallization. If the polyester resin (A) is crystallized, it is preferred to reduce the crystallization energy of the polyester resin (A) to the lowest possible level. The crystallization energy of the polyester resin (A) is typically not greater than 35 J/g, preferably not greater than 20 J/g, particularly preferably not greater than 10 J/g, especially preferably not greater than 5 J/g.

The polyester resin (A) preferably has an acid value of not greater than 10 mg KOH/g, particularly preferably not greater than 3 mg KOH/g, and more preferably not greater than 1 mg KOH/g. If the acid value of the polyester resin (A) is excessively high, the adhesive tape is liable to corrode a metal layer or the like brought into contact with a surface of the adhesive agent layer thereof. When the adhesive tape is applied to a metal oxide thin film, for example, the metal oxide thin film tends to suffer from corrosion and, hence, reduction in electrical conductivity.

The acid value of the polyester resin (A) is determined by neutralization titration based on JIS K0070.

[Hydrolysis Inhibitor (B)]

The polyester adhesive agent composition [II] to be used in the present disclosure preferably contains the hydrolysis inhibitor (B) together with the polyester resin (A). The hydrolysis inhibitor (B) ensures long-term durability.

A conventionally known hydrolysis inhibitor may be used as the hydrolysis inhibitor (B). For example, a compound which reacts to be bonded to a terminal carboxylic acid group of the polyester resin (A) may be used as the hydrolysis inhibitor (B), and specific examples thereof include compounds containing a functional group such as carbodiimide group, epoxy group or oxazoline group. Of these, a carbodiimide-containing compound is preferred, because of its higher effect for eliminating the catalytic activity of a proton of the terminal carboxyl group.

Typically, a known polycarbodiimide having one or more carbodiimide groups (—N=C=N—) in its molecule may be used as the carbodiimide-containing compound. In order to improve the durability in a higher temperature and higher humidity environment, a compound containing two or more carbodiimide groups in its molecule, i.e., a polyvalent carbodiimide compound, is preferred, and a compound having three or more carbodiimide groups in its molecule is particularly preferred. Further, a compound having five or more carbodiimide groups in its molecule is preferred, and a compound having seven or more carbodiimide groups in its molecule is especially preferred. However, a compound having 30 or more carbodiimide groups in its molecule is not preferred because of its excessively large molecular structure. A high-molecular weight polycarbodiimide prepared by a decarbonation condensation reaction of a diisocyanate in the presence of a carbodiimidization catalyst is also preferred as the carbodiimide-containing compound.

The following exemplary diisocyanates are usable as the diisocyanate to be subjected to the decarbonation condensation reaction for the preparation of the high-molecular weight polycarbodiimide.

The exemplary diisocyanates include 4,4'-diphenylmethane diisocyanate, 3,3'-dimethoxy-4,4'-diphenylmethane diisocyanate, 3,3'-dimethyl-4,4'-diphenylmethane diisocyanate, 4,4'-diphenyl ether diisocyanate, 3,3'-dimethyl-4,4'-diphenyl ether diisocyanate, 2,4-tolylene diisocyanate, 2,6-tolylene diisocyanate, 1-methoxyphenyl-2,4-diisocyanate, isophorone diisocyanate, 4,4'-dicyclohexylmethane diisocyanate, and tetramethylxylylene diisocyanate, which may be used alone or in combination. These high-molecular weight polycarbodiimides may be synthesized, or commercially available products of the high-molecular weight polycarbodiimides may be used.

Examples of the commercially available products of the polycarbodiimide-containing compounds include CARBODILITE (registered trade name) series available from Nisshinbo Chemical Inc. Of these, CARBODILITE (registered trade name) V-01, V-02B, V-03, V-04K, V-04PF, V-05, V-07, V-09, and V-09 GB are particularly preferred because of their excellent compatibility with organic solvents.

The epoxy-containing compound is preferably, for example, a glycidyl ester compound, a glycidyl ether compound or the like.

Specific examples of the glycidyl ester compound include glycidyl benzoate, glycidyl t-butyl-benzoate, glycidyl p-toluate, glycidyl cyclohexanecarboxylate, glycidyl pelargonate, glycidyl stearate, glycidyl laurate, glycidyl palmitate, glycidyl behenate, glycidyl versatate, glycidyl oleate, glycidyl linoleate, glycidyl linolenate, glycidyl behenolate, glycidyl stearolate, diglycidyl terephthalate, diglycidyl isophthalate, diglycidyl phthalate, diglycidyl naphthalenedicarboxylate, diglycidyl methylterephthalate, diglycidyl hexahydrophthalate, diglycidyl tetrahydrophthalate, diglycidyl cyclohexanedicarboxylate, diglycidyl adipate, diglycidyl succinate, diglycidyl sebacate, diglycidyl dodecanedioate, diglycidyl octadecanedicarboxylate, triglycidyl trimellitate, and tetraglycidyl pyromellitate, which may be used alone or in combination.

Specific examples of the glycidyl ether compound include phenyl glycidyl ether, o-phenyl glycidyl ether, 1,4-bis(β,γ-epoxypropoxy)butane, 1,6-bis(β,γ-epoxypropoxy)hexane, 1,4-bis(β,γ-epoxypropoxy)benzene, 1-(β,γ-epoxypropoxy)-2-ethoxyethane, 1-(β,γ-epoxypropoxy)-2-benzyloxyethane, 2,2-bis[p-(β,γ-epoxypropoxy)phenyl]propane, 2,2-bis(4-hydroxyphenyl) propane, 2,2-bis(4-hydroxyphenyl)methane, and other bisglycidyl polyethers prepared by a reaction between bisphenols and epichlorohydrin. These may be used alone or in combination.

A bisoxazoline compound is preferred as the oxazoline-containing compound. Specific examples of the bisoxazoline compound include 2,2'-bis(2-oxazoline), 2,2'-bis(4-methyl-2-oxazoline), 2,2'-bis(4,4-dimethyl-2-oxazoline), 2,2'-bis(4-ethyl-2-oxazoline), 2,2'-bis(4,4'-diethyl-2-oxazoline), 2,2'-bis(4-propyl-2-oxazoline), 2,2'-bis(4-butyl-2-oxazoline), 2,2'-bis(4-hexyl-2-oxazoline), 2,2'-bis(4-phenyl-2-oxazoline), 2,2'-bis(4-cyclohexyl-2-oxazoline), 2,2'-bis(4-benzyl-2-oxazoline), 2,2'-p-phenylenebis(2-oxazoline), 2,2'-m-phenylenebis(2-oxazoline), 2,2'-o-phenylenebis(2-oxazoline), 2,2'-p-phenylenebis(4-methyl-2-oxazoline), 2,2'-p-phenylenebis(4,4-dimethyl-2-oxazoline), 2,2'-m-phenylenebis(4-methyl-2-oxazoline), 2,2'-m-phenylenebis(4,4-dimethyl-2-oxazoline), 2,2'-ethylenebis(2-oxazoline), 2,2'-tetramethylenebis(2-oxazoline), 2,2'-hexamethylenebis(2-oxazoline), 2,2'-octamethylenebis(2-oxazoline), 2,2'-decamethylenebis(2-oxazoline), 2,2'-ethylenebis(4-methyl-2-oxazoline), 2,2'-tetramethylenebis(4,4-dimethyl-2-oxazoline), 2,2'-9,9'-diphenoxyethanebis(2-oxazoline), 2,2'-cyclohexylenebis(2-oxazoline), and 2,2'-diphenylenebis(2-oxazoline). Of these, 2,2'-bis(2-oxazoline) is most preferred from the viewpoint of the reactivity with the polyester resin (A). These may be used alone or in combination.

The hydrolysis inhibitor (B) preferably has a lower volatility and, therefore, preferably has a higher number average molecular weight. The number average molecular weight of the hydrolysis inhibitor (B) is typically 300 to 10,000, preferably 1,000 to 5,000.

From the viewpoint of the hydrolysis resistance, the hydrolysis inhibitor (B) preferably has a higher weight average molecular weight. The weight average molecular weight of the hydrolysis inhibitor (B) is preferably not less than 500, more preferably not less than 2,000, still more preferably not less than 3,000. The upper limit of the weight average molecular weight is typically 50,000, preferably 10,000

If the molecular weight of the hydrolysis inhibitor (B) is excessively small, the hydrolysis resistance tends to be reduced. If the molecular weight of the hydrolysis inhibitor (B) is excessively great, the compatibility with the polyester resin (A) tends to be reduced.

Of the hydrolysis inhibitors described above, the carbodiimide-containing compound is preferably used as the hydrolysis inhibitor (B). In this case, the carbodiimide equivalent is preferably 50 to 10,000, particularly preferably 100 to 1,000, more preferably 150 to 500. The carbodiimide equivalent means a chemical formula weight per one carbodiimide group.

The proportion of the hydrolysis inhibitor (B) is preferably 0.01 to 10 parts by weight, particularly preferably 0.1 to 5 parts by weight, more preferably 0.2 to 3 parts by weight, based on 100 parts by weight of the polyester resin (A). If the proportion of the hydrolysis inhibitor (B) is excessively great, the compatibility with the polyester resin (A) tends to be reduced, resulting in turbidity. If the proportion of the hydrolysis inhibitor (B) is excessively small, it tends to be difficult to ensure sufficient durability.

The proportion of the hydrolysis inhibitor (B) is preferably optimized according to the acid value of the polyester resin (A). The molar ratio (b)/(a) of the total mol number (b) of the functional groups of the hydrolysis inhibitor (B) in the adhesive agent composition to the total mol number of the acidic functional groups of the polyester resin (A) in the adhesive agent composition is preferably 0.5≤(b)/(a), particularly preferably 1 (b)/(a)≤1,000, more preferably 1.5≤(b)/(a)≤100.

If the molar ratio (b)/(a) is excessively small, the moist heat resistance tends to be reduced. If the molar ratio (b)/(a) is excessively great, the compatibility with the polyester resin (A), the adhesive force, the cohesive force, and the durability tend to be reduced.

[Urethanization Catalyst (C)]

The polyester adhesive agent composition [II] to be used in the present disclosure contains the polyester resin (A), and preferably further contains the hydrolysis inhibitor (B). From the viewpoint of the reaction rate, the polyester adhesive agent composition [II] more preferably further contains the urethanization catalyst (C).

Examples of the urethanization catalyst (C) include organic metal compounds and tertiary amine compounds, which may be used alone or in combination.

Examples of the organic metal compounds include zirconium compounds, iron compounds, tin compounds, titanium compounds, lead compounds, cobalt compounds, and zinc compounds.

Examples of the zirconium compounds include zirconium naphthenate and zirconium acetylacetonate.

Examples of the iron compounds include iron acetylacetonate and iron 2-ethylhexanoate.

Examples of the tin compounds include dibutyl tin dichloride, dibutyl tin oxide, and dibutyl tin dilaurate.

Examples of the titanium compounds include dibutyl titanium dichloride, tetrabutyl titanate, and butoxy titanium trichloride.

Examples of the lead compounds include lead oleate, lead 2-ethylhexanoate, lead benzoate, and lead naphthenate.

Examples of the cobalt compound include cobalt 2-ethylhexanoate and cobalt benzoate.

Examples of the zinc compounds include zinc naphthenate and zinc 2-ethylhexanoate.

Examples of the tertiary amine compounds include triethylamine, triethylenediamine, and 1,8-diazabicyclo-(5,4,0)-undecene-7.

Of these urethanization catalysts, the organic metal compounds are preferred as the urethanization catalyst (C) from the viewpoint of the reaction rate and the pot life of the adhesive agent layer. Particularly, the zirconium compounds are preferred. The urethanization catalyst (C) is preferably used in combination with acetylacetone as a catalyzation inhibitor. The use of acetylacetone advantageously suppresses the catalyzation at a lower temperature to thereby increase the pot life.

[Crosslinking Agent (D)]

The polyester adhesive agent composition [II] to be used in the present disclosure contains the polyester resin (A), and preferably further contains the hydrolysis inhibitor (B). The polyester adhesive agent composition [II] typically further contains the crosslinking agent (D). The use of the crosslinking agent (D) makes it possible to crosslink the polyester resin (A) with the crosslinking agent (D) to impart the polyester resin (A) with excellent cohesive force, thereby improving the properties of the adhesive agent.

Examples of the crosslinking agent (D) include compounds having a functional group that is reactive with a hydroxyl group and/or a carboxyl group of the polyester resin (A) such as polyisocyanate compound and polyepoxy compound. Of these, the polyisocyanate compound is preferred because the initial adhesiveness, the mechanical strength, and the heat resistance can be properly balanced.

Examples of the polyisocyanate compound include polyisocyanates such as tetramethylene diisocyanate, hexamethylene diisocyanate, isophorone diisocyanate, tolylene diisocyanate, diphenylmethane diisocyanate, hydrogenated diphenylmethane diisocyanate, xylylene diisocyanate, hydrogenated xylylene diisocyanate, tetramethylxylylene diisocyanate, 1,5-naphthalene diisocyanate, and triphenylmethane triisocyanate, adducts of any of these polyisocyanates and a polyol compound such as trimethylolpropane, and biuret compounds and isocyanurate compounds of any of these polyisocyanates. The polyisocyanate compound to be used may have an isocyanate portion blocked with a phenol or a lactam. These crosslinking agents may be used alone or in combination as the crosslinking agent (D).

The proportion of the crosslinking agent (D) may be properly selected according to the molecular weight of the polyester resin (A) and the use purpose. The proportion of the crosslinking agent (D) is preferably such that a reactive group is present in the crosslinking agent (D) in 0.2 to 10 equivalents, particularly preferably 0.5 to 5 equivalents, more preferably 0.5 to 3 equivalents, per equivalent of the hydroxyl group and/or the carboxyl group of the polyester resin (A).

If the equivalent amount of the reactive group present in the crosslinking agent (D) is excessively small, the cohesive force tends to be reduced. If the equivalent amount of the reactive group present in the crosslinking agent (D) is excessively great, the flexibility tends to be reduced.

In the reaction between the polyester resin (A) and the crosslinking agent (D), an organic solvent not having a functional group reactive with the polyester resin (A) and the crosslinking agent (D) may be used. Examples of the organic solvent include esters such as ethyl acetate and butyl acetate, ketones such as methyl ethyl ketone and methyl isobutyl ketone, and aromatic compounds such as toluene and xylene, which may be used alone or in combination.

The polyester adhesive agent composition [II] to be used in the present disclosure may contain additives in addition to the polyester resin (A), the hydrolysis inhibitor (B), the urethanization catalyst (C), and the crosslinking agent (D), as long as the effects of the present disclosure are not impaired. Examples of the additives include an antioxidant (E) such as hindered phenol, softening agent, UV absorber, stabilizer, antistatic agent, tackifier, inorganic or organic filler, and powdery and particulate additives such as metal powder and pigment, which may be used alone or in combination.

The polyester adhesive agent to be used in the present disclosure is made from the polyester adhesive agent composition [II]. That is, the polyester adhesive agent is prepared by curing the polyester adhesive agent composition [II].

<Adhesive Tape>

The adhesive tape according to the present disclosure can be produced, for example, in the following manner by using the substrate [I] and the polyester adhesive agent composition [II].

A generally known adhesive tape production method may be used for the production of the adhesive tape. An exemplary adhesive tape production method includes the steps of applying and drying the polyester adhesive agent composition [II] on the substrate [I], placing a release sheet (or a release film) on a surface of the resulting layer of the polyester adhesive agent composition [II] and, as required, aging the polyester adhesive agent composition [II]. Thus, the adhesive tape according to the present disclosure is produced as having the substrate [I] and the adhesive agent layer of the polyester adhesive agent provided on the substrate [I].

Another exemplary method for producing the adhesive tape according to the present disclosure includes the steps of applying and drying the polyester adhesive agent composition [II] on a release sheet, placing the substrate [I] on a surface of the resulting layer of the polyester adhesive agent composition [II] and, as required, aging the polyester adhesive agent composition [II].

The adhesive tape according to the present disclosure may include the substrate [I], and adhesive agent layers of the polyester adhesive agent provided on opposite surfaces of the substrate [I].

Examples of the release sheet include: sheets made of synthetic resins including polyester resins such as polyethylene naphthalate, polyethylene terephthalate, polybutylene terephthalate, and polyethylene terephthalate/isophthalate copolymers, polyolefin resins such as polyethylene, polypropylene, and polymethylpentene, polyfluoroethylene resins such as polyvinyl fluoride, polyvinylidene fluoride, and polyfluoroethylene, polyamides such as nylon 6 and nylon 6,6, vinyl polymers such as polyvinyl chloride, polyvinyl chloride/vinyl acetate copolymers, ethylene/vinyl acetate copolymers, ethylene/vinyl alcohol copolymers, polyvinyl alcohol, and vinylon, cellulose resins such as cellulose triacetate and cellophane, acrylic resins such as polymethyl methacrylate, polyethyl methacrylate, polyethyl acrylate, and polybutyl acrylate, polystyrene, polycarbonate, polyarylate, polyimide, and cycloolefin polymers; and metal foils such as of aluminum, copper, and iron, paper sheets such as high-quality paper and glassine paper, and woven and nonwoven fabrics of glass fibers, natural fibers, and synthetic fibers which are subjected to a releasability imparting treatment. It is preferred to use a silicone release sheet as the release sheet.

A coater such as gravure roll coater, reverse roll coater, kiss roll coater, dip roll coater, bar coater, knife coater, spray coater or comma coater may be used for the application of the polyester adhesive agent composition [II].

For the aging, the temperature is typically a room temperature (23° C.) to 70° C., and the period is typically 1 to 30 days. Specifically, the aging step is performed, for example, at 23° C. for 1 to 20 days, preferably at 23° C. for 3 to 14 days or at 40° C. for 1 to 10 days.

For the drying, the drying temperature is preferably 60° C. to 140° C., particularly preferably 80° C. to 120° C., and the drying period is preferably 0.5 to 30 minutes, particularly preferably 1 to 5 minutes.

The adhesive agent layer of the adhesive tape preferably has a thickness of 2 to 500 µm, particularly preferably 5 to 200 µm, more preferably 10 to 100 µm. If the thickness of the adhesive agent layer is excessively small, the adhesive force tends to be reduced. If the thickness of the adhesive agent layer is excessively great, it tends to be difficult to uniformly apply the polyester adhesive agent composition, and the applied layer is liable to suffer from bubbling and other inconveniences. In consideration of the impact absorbing property, the thickness is preferably not less than 50 µm.

The thickness of the adhesive agent layer is determined by measuring the thickness of the entire adhesive tape and the thickness of constituents of the adhesive tape other than the adhesive agent layer by means of ID-C112B available from Mitutoyo Corporation, and subtracting the other adhesive tape constituent thickness from the entire adhesive tape thickness thus measured.

With the thickness of the substrate [I] being assumed as 100, the thickness of the adhesive agent layer is typically 5 to 100, preferably 10 to 50. If the thickness ratio of the adhesive agent layer is excessively low, the adhesive force tends to be reduced. If the thickness ratio of the adhesive agent layer is excessively high, it tends to be difficult to uniformly form the adhesive agent layer, and the applied layer is liable to suffer from bubbling or other inconvenience.

The adhesive agent layer of the adhesive tape preferably has a gel fraction of not less than 10 wt. %, particularly preferably 15 to 95 wt. %, more preferably 20 to 90 wt. %, from the viewpoint of the durability and the adhesive force. If the gel fraction is excessively low, the durability tends to be reduced due to reduction in cohesive force. If the gel fraction is excessively high, the adhesive force tends to be reduced due to increase in cohesive force.

The gel fraction is an index indicating the crosslinking degree. The gel fraction is calculated, for example, by the following method. The adhesive tape produced by forming the adhesive agent layer on the substrate [I] (without provision of the release sheet) is wrapped with a 200-mesh stainless steel wire net, and immersed in toluene at 23° C. for 24 hours. Then, the gel fraction is determined as the percentage of the weight of an undissolved adhesive agent component remaining in the wire net after the immersion with respect to the weight of the adhesive agent component before the immersion. The weight of the substrate [I] is subtracted from the weights of the adhesive agent component.

As required, the release sheet may be provided on the outside of the adhesive agent layer of the adhesive tape for protection of the adhesive agent layer. Where the adhesive agent layer is provided on one side of the substrate [I] of the adhesive tape, the releasability imparting treatment may be performed on a surface of the substrate [I] opposite from the side provided with the adhesive agent layer. Thus, the adhesive agent layer can be protected by the surface of the substrate [I] subjected to the releasability imparting treatment.

EXAMPLES

The embodiment of the present disclosure will hereinafter be described more specifically by way of examples thereof. However, it should be understood that the present disclosure be not limited to these examples within the scope of the present disclosure. In the following examples, "parts" is based on weight.

Prior to production of adhesive tapes, the following polyolefin resin foam substrates and urethane resin foam substrates were prepared as the substrate [I]. The apparent density and the thickness of each of the polyolefin resin foam substrates and the urethane resin foam substrates were determined with reference to catalogs provided by the manufacturers, and the tensile strength and the elongation percentage of each of the foam substrates were measured by the methods described above.

<Polyolefin Resin Foam Substrates>
(Polypropylene Resin Foam Substrates)
I-1: A polypropylene resin foam substrate (having an apparent density of 180 kg/m$^3$, a tensile strength of 0.66 MPa, an elongation percentage of 295%, and a thickness of 1 mm)
I-2: A polypropylene resin foam substrate (having an apparent density of 270 kg/m$^3$, a tensile strength of 0.59 MPa, an elongation percentage of 268%, and a thickness of 1 mm)
(Polyethylene Resin Foam Substrate)
I-3: A polyethylene resin foam substrate (having an apparent density of 90 kg/m$^3$, a tensile strength of 0.68 MPa, an elongation percentage of 177%, and a thickness of 0.75 mm)
<Urethane Resin Foam Substrates>
I-4: A urethane resin foam substrate (having an apparent density of 400 kg/m$^3$ and a thickness of 0.5 mm)
I-5: A urethane resin foam substrate (having an apparent density of 480 kg/m$^3$ and a thickness of 0.3 mm)
I-6: A urethane resin foam substrate (having an apparent density of 600 kg/m$^3$, a tensile strength of 0.84 MPa, an elongation percentage of 97%, and a thickness of 0.7 mm)
I-7: A urethane resin foam substrate (having an apparent density of 600 kg/m$^3$, a tensile strength of 0.6 MPa, an elongation percentage of 127%, and a thickness of 1 mm)
I-8: A urethane resin foam substrate (having an apparent density of 700 kg/m$^3$, a tensile strength of 1.1 MPa, an elongation percentage of 100%, and a thickness of 0.2 mm)
I-9: A urethane resin foam substrate (having an apparent density of 150 kg/m$^3$, a tensile strength of 0.5 MPa, an elongation percentage of 335%, and a thickness of 0.5 mm
<Preparation of Polyester Resin (A)>

Next, a polyester resin was prepared.

In the following exemplary preparation method, the term "mol %" means a molar percentage with respect to the overall amount of the polyvalent carboxylic acid compound (a1) assumed as 100 mol %. The glass transition temperature, the weight average molecular weight, and the ester bond concentration of the polyester resin were measured by the methods described above.

[Preparation of Polyester Resin (A-1)]

In a reaction vessel provided with a heating device, a thermometer, a stirrer, a rectification column, a nitrogen inlet tube, and a vacuum device, 66.3 parts (20 mol %) of isophthalic acid (IPA) and 322.9 parts (80 mol %) of sebacic acid (SebA) as the polyvalent carboxylic acid compound (a1), 207.9 parts (100 mol %) of neopentyl glycol (NPG), 89.9 parts (50 mol %) of 1,4-butanediol (1,4BG), and 4.0 parts (1.5 mol %) of trimethylolpropane (TMP) as the polyol (a2), 9.0 parts (0.3 mol %) of hydrogenated polybutadiene-polyol (GI-1000 available from Nippon Soda Co., Ltd.) as the hydrogenated polybutadiene structure-containing compound (a3), 0.05 parts of zinc acetate as the catalyst were fed, and were subjected to the esterification reaction for 4 hours while the internal temperature was gradually increased to 250° C.

Thereafter, the internal temperature was increased to 260° C., and 0.05 parts of tetrabutyl titanate was fed as the catalyst. With the pressure reduced to 1.33 hPa, the polymerization reaction was allowed to proceed for 3 hours. Thus, a polyester resin (A-1) was prepared.

The polyester resin (A-1) thus prepared had a glass transition temperature of −46.8° C., and had a resultant structural unit ratio (hereinafter sometimes referred to as "formulation ratio") such that the ratio of isophthalic acid/ sebacic acid as the polyvalent carboxylic acid compound (a1) was 20 mol %/80 mol %, and the ratio of neopentyl glycol/1,4-butanediol/trimethylolpropane/hydrogenated polybutadienepolyol as the polyol (a2) was 64.5 mol %/33.7 mol %/1.5 mol %/0.3 mol %.

The proportion of the structural unit derived from the hydrogenated polybutadiene structure-containing compound (a3) in the polyester resin (A-1) was 1.7 wt. %. The polyester resin (A-1) had a weight average molecular weight of 73,000 and an ester bond concentration of 7.6 mmol/g.

<Production of Polyester Adhesive Agent Composition [II]>

The polyester adhesive agent composition [II] was produced by using the polyester resin (A-1) prepared in the aforementioned manner.

(Production of Polyester Adhesive Agent Composition [II-1])

The polyester resin (A-1) prepared in the aforementioned manner was diluted to a solid concentration of 50% with toluene. Then, 1 part (solid content) of a hydrolysis inhibitor (CARBODILITE V-09 GB available from Nisshinbo Chemical Inc.), 2 parts (solid content) of a trimethylolpropane/tolylene diisocyanate adduct (CORONATE L55E available from Tosoh Corporation) as the crosslinking agent, and 0.01 part (solid content) of a zirconium compound diluted to a solid concentration of 1% with acetylacetone (ORGATIX ZC-150 available from Matsumoto Fine Chemical Co., Ltd.) as the urethanization catalyst were blended and mixed with 200 parts (a solid content of 100 parts) of the resulting solution of the polyester resin (A-1) with stirring. Thus, a polyester adhesive agent composition [II-1] was produced.

Further, an acrylic adhesive agent composition [II'] was prepared as an adhesive agent commonly used for the adhesive tape by the following method.

<Preparation of Acrylic Resin>

In a four-neck round-bottom flask provided with a reflux condenser, a stirrer, a nitrogen gas blowing port, and a thermometer, 91.9 parts of butyl acrylate, 8 parts of acrylic acid, 0.1 part of hydroxyethyl methacrylate, and 80 parts of ethyl acetate were fed and, after the thermal reflux of the resulting mixture was started, 0.5 parts of azobisisobutyronitrile (AIBN) was added as a polymerization initiator to the mixture. After a reaction was allowed to proceed in the resulting mixture at an ethyl acetate reflux temperature for 7 hours, the resulting mixture was diluted with ethyl acetate. Thus, an acrylic resin solution was prepared.

The acrylic resin thus prepared had a glass transition temperature of −46° C. and a weight average molecular weight of 750,000. The glass transition temperature was calculated by using a Fox formula, and the weight average molecular weight was measured by the same method as used for the measurement of the weight average molecular weight of the polyester resin.

(Production of Acrylic Adhesive Agent Composition [II'])

Then, 1 part (solid content) of a trimethylolpropane/ tolylene diisocyanate adduct (CORONATE L55E available from Tosoh Corporation) as a crosslinking agent was blended and mixed with 285 parts (a solid content of 100 parts) of the acrylic resin solution prepared in the aforementioned manner with stirring. Thus, an acrylic adhesive agent composition [II'] was produced.

<Production of Adhesive Tapes>

Adhesive tapes of Examples 1 to 9 and Comparative Examples 1 to 3 were produced by using the substrates [I], and the polyester adhesive agent composition [II-1] and the acrylic adhesive agent composition [II'].

Example 1

The polyester adhesive agent composition [II-1] was applied onto a 38-μm thick PET release film (SP-PET-03-BU available from Mitsui Chemicals Tohcello, Inc.) with the use of an applicator, and dried at 100° C. for 4 minutes. Thus, an adhesive sheet including a 50-μm thick adhesive agent composition layer provided with a release film was produced.

Then, the adhesive agent composition layer of the adhesive sheet provided with the release film was applied onto the polypropylene resin foam substrate [I-1] (having an apparent density of 180 kg/m$^3$ and a thickness of 1 mm), and aged at 40° C. for 4 days. Thus, a single-sided adhesive tape provided with the release film was produced.

Example 2

An adhesive tape of Example 2 was produced in substantially the same manner as in Example 1, except that the polypropylene resin foam substrate [I-2] (having an apparent density of 270 kg/m$^3$ and a thickness of 1 mm) was used instead of the polypropylene resin foam substrate [I-1].

Example 3

An adhesive tape of Example 3 was produced in substantially the same manner as in Example 1, except that the polyethylene resin foam substrate [I-3] (having an apparent density of 90 kg/m$^3$ and a thickness of 0.75 mm) was used instead of the polypropylene resin foam substrate [I-1].

Example 4

An adhesive tape of Example 4 was produced in substantially the same manner as in Example 1, except that the urethane resin foam substrate [I-4] (having an apparent density of 400 kg/m$^3$ and a thickness of 0.5 mm) was used instead of the polypropylene resin foam substrate [I-1].

Example 5

An adhesive tape of Example 5 was produced in substantially the same manner as in Example 1, except that the urethane resin foam substrate [I-5] (having an apparent density of 480 kg/m$^3$ and a thickness of 0.3 mm) was used instead of the polypropylene resin foam substrate [I-1].

Example 6

An adhesive tape of Example 6 was produced in substantially the same manner as in Example 1, except that the urethane resin foam substrate [I-6] (having an apparent density of 600 kg/m$^3$ and a thickness of 0.7 mm) was used instead of the polypropylene resin foam substrate [I-1].

Example 7

An adhesive tape of Example 7 was produced in substantially the same manner as in Example 1, except that the urethane resin foam substrate [I-7] (having an apparent density of 600 kg/m$^3$ and a thickness of 1 mm) was used instead of the polypropylene resin foam substrate [I-1].

Example 8

An adhesive tape of Example 8 was produced in substantially the same manner as in Example 1, except that the urethane resin foam substrate [I-8] (having an apparent density of 700 kg/m³ and a thickness of 0.2 mm) was used instead of the polypropylene resin foam substrate [I-1].

Example 9

An adhesive tape of Example 9 was produced in substantially the same manner as in Example 1, except that the urethane resin foam substrate [I-9] (having an apparent density of 150 kg/m³ and a thickness of 0.5 mm) was used instead of the polypropylene resin foam substrate [I-1].

Comparative Example 1

An adhesive tape of Comparative Example 1 was produced in substantially the same manner as in Example 1, except that a PET film (LUMIRROR T60 available from Toray Industries, Inc. and having a thickness of 38 μm) was used instead of the polypropylene resin foam substrate [I-1].

Comparative Example 2

An adhesive tape of Comparative Example 2 was produced in substantially the same manner as in Example 1, except that the acrylic adhesive agent composition [II'] was used instead of the polyester adhesive agent composition [II-1], and the polyethylene resin foam substrate [I-3] was used instead of the polypropylene resin foam substrate [I-1].

Comparative Example 3

An adhesive tape of Comparative Example 3 was produced in substantially the same manner as in Example 1, except that the acrylic adhesive agent composition [II'] was used instead of the polyester adhesive agent composition [II-1], and the urethane resin foam substrate [I-8] was used instead of the polypropylene resin foam substrate [I-1].

The peel strength of each of the adhesive tapes of Examples 1 to 9 and Comparative Examples 1 to 3 with respect to a polypropylene adherend was measured.
<Peel Strength to Polypropylene Adherend>
After the adhesive tape was cut to a size of 25 mm×200 mm in an environment at 23° C. at 50% RH, the release film was removed from the adhesive tape, and the adhesive agent layer was bonded to a polypropylene plate by reciprocally press-rolling a 2-kg roller on the adhesive tape. After the adhesive tape was allowed to stand in the same environment for 90 minutes, the 180-degree peel strength (N/25 mm) was measured at a peel rate of 300 mm/minute by means of an autograph (AUTOGRAPH AGS-H 500N available from Shimadzu Corporation). The results are shown below in Table 1.

TABLE 1

| | Adhesive agent composition | | Substrate | | Peel strength (N/25 mm) with respect to polypropylene adherend |
|---|---|---|---|---|---|
| Example 1 | Polyester | II-1 | Polypropylene resin form | I-1 | 17.6 |
| Example 2 | Polyester | II-1 | Polypropylene resin form | I-2 | 12.3 |
| Example 3 | Polyester | II-1 | Polyethylene resin form | I-3 | 20.3 |
| Example 4 | Polyester | II-1 | Urethane resin form | I-4 | 13.1 |
| Example 5 | Polyester | II-1 | Urethane resin form | I-5 | 23.6 |
| Example 6 | Polyester | II-1 | Urethane resin form | I-6 | 14.4 |
| Example 7 | Polyester | II-1 | Urethane resin form | I-7 | 15.6 |
| Example 8 | Polyester | II-1 | Urethane resin form | I-8 | 29.9 |
| Example 9 | Polyester | II-1 | Urethane resin form | I-9 | 11.4 |
| Comparative Example 1 | Polyester | II-1 | PET | — | 5.5 |
| Comparative Example 2 | Acrylic | II' | Polyethylene resin form | I-3 | — |
| Comparative Example 3 | Acrylic | II' | Urethane resin form | I-8 | 6.1 |

The results shown in Table 1 indicate that the adhesive tapes of Examples 1 to 9 are excellent in peel strength with respect to the polypropylene adherend. This means that the adhesive tapes of Examples 1 to 3 are each excellent in adherence between the polyolefin resin foam substrate and the polyester adhesive agent layer and in adhesiveness between the polyester adhesive agent layer and the polypropylene adherend. This further means that the adhesive tapes of Examples 4 to 9 are each excellent in adherence between the urethane resin foam substrate and the polyester adhesive agent layer and in adhesiveness between the polyester adhesive agent layer and the polypropylene adherend.

In contrast, the adhesive tape of Comparative Example 1 employing the PET substrate and the adhesive tapes of Comparative Examples 2 and 3 employing the acrylic adhesive agent are poorer in peel strength with respect to the polypropylene adherend than the adhesive tapes of Examples 1 to 9. This means that the adhesive tapes each produced by using the polyolefin resin foam substrate or the polyurethane resin foam substrate in combination with the polyester adhesive agent are excellent in adhesiveness.

Where adhesive tapes are produced in substantially the same manner as in Examples by using an acrylic resin foam substrate as the substrate [I], the same effects as in Examples are provided.

While specific forms of the embodiment of the present disclosure have been shown in the aforementioned examples, the examples are merely illustrative but not limitative. It is contemplated that various modifications apparent to those skilled in the art could be made within the scope of the invention.

The adhesive tape according to the present disclosure is excellent in adherence between the polyester adhesive agent layer and the polyolefin resin foam substrate, the urethane resin foam substrate or the acrylic resin foam substrate and, therefore, can be advantageously used for various bonding applications.

The invention claimed is:

1. An adhesive tape comprising:
a substrate [I]; and
an adhesive agent layer of a polyester adhesive agent provided on at least one of opposite surfaces of the substrate [I];
wherein the substrate [I] is one selected from the group consisting of a polyolefin resin foam substrate, a urethane resin foam substrate, and an acrylic resin foam substrate;
wherein the polyolefin resin foam substrate has an apparent density of 10 to 200 kg/m$^3$;
wherein the urethane resin foam substrate and the acrylic resin foam substrate have an apparent density of 200 to 1000 kg/m$^3$;
wherein the polyester adhesive agent is made from a polyester adhesive agent composition [II] which comprises a polyester resin (A)
having a weight average molecular weight of 20,000 to 300,000, and having
a structural unit derived from a polyol and
a structural unit derived from
a polyvalent carboxylic acid compound containing an aromatic structure-containing compound in a proportion of not greater than 40 mol % of the polyvalent carboxylic acid compound;
wherein the polyester resin (A) has a structural unit derived from a hydrogenated polybutadiene structure-containing compound (a3);
wherein the structural unit derived from the hydrogenated polybutadiene structure-containing compound (a3) is present in a proportion of less than 10 wt. % with respect to 100 wt. % of the polyester resin (A),
wherein the polyester resin (A) has an acid value of not greater than 3 mg KOH/g, and
wherein the polyester resin (A) has an ester bond concentration of 7 to 9.5 mmol/g.

2. The adhesive tape according to claim 1, wherein the substrate [I] is the polyolefin resin foam substrate.

3. The adhesive tape according to claim 1, wherein the substrate [I] is selected from the urethane resin foam substrate and the acrylic resin foam substrate.

4. The adhesive tape according to claim 1, wherein the polyester adhesive agent composition [II] further comprises a hydrolysis inhibitor.

5. The adhesive tape according to claim 1, wherein the substrate [I] has a thickness of 0.1 to 2 mm.

* * * * *